(12) United States Patent
Leeb et al.

(10) Patent No.: US 7,016,115 B1
(45) Date of Patent: Mar. 21, 2006

(54) COMMUNICATION WITH NON-FLICKERING ILLUMINATION

(75) Inventors: Steven B. Leeb, Belmont, MA (US); Gary Livshin, Boston, MA (US); Al-Thaddeus Avestruz, Waltham, MA (US); Roderick T. Hinman, Natick, MA (US); Elmer C. Lupton, Charlestown, MA (US); Deron K. Jackson, San Jose, CA (US); George B. Hovorka, East Boston, MA (US)

(73) Assignee: Talking Lights, LLC, Boston, MA (US)

(*) Notice: Subject to any disclaimer, the term of this patent is extended or adjusted under 35 U.S.C. 154(b) by 0 days.

(21) Appl. No.: 10/946,166

(22) Filed: Sep. 21, 2004

Related U.S. Application Data

(63) Continuation-in-part of application No. 10/201,378, filed on Jul. 23, 2002, now Pat. No. 6,794,831, and a continuation-in-part of application No. 09/770,806, filed on Jan. 26, 2001, now Pat. No. 6,426,599, and a continuation of application No. 09/291,706, filed on Apr. 14, 1999, now Pat. No. 6,198,230, and a continuation-in-part of application No. 10/617,082, filed on Jul. 10, 2003, and a continuation-in-part of application No. 10/161,458, filed on May 31, 2002, now Pat. No. 6,954,591, which is a continuation of application No. 09/291,709, filed on Apr. 14, 1999, now Pat. No. 6,400,482.

(60) Provisional application No. 60/308,486, filed on Jul. 25, 2001, provisional application No. 60/311,037, filed on Aug. 9, 2001, provisional application No. 60/326,277, filed on Oct. 1, 2001, provisional application No. 60/338,912, filed on Nov. 26, 2001, provisional application No. 60/337,491, filed on Nov. 26, 2001, provisional application No. 60/341,191, filed on Dec. 7, 2001, provisional application No. 60/353,253, filed on Feb. 1, 2002, provisional application No. 60/367,393, filed on Mar. 25, 2002, provisional application No. 60/191,725, filed on Mar. 24, 2000, provisional application No. 60/081,866, filed on Apr. 15, 1998, provisional application No. 60/108,287, filed on Nov. 13, 1998, provisional application No. 60/115,374, filed on Jan. 11, 1999, provisional application No. 60/402,434, filed on Aug. 9, 2002, provisional application No. 60/416,357, filed on Oct. 4, 2002, provisional application No. 60/450,072, filed on Feb. 25, 2003, provisional application No. 60/476,876, filed on Jun. 6, 2003, provisional application No. 60/081,866, filed on Apr. 15, 1998, provisional application No. 60/108,287, filed on Nov. 13, 1998, provisional application No. 60/115,374, filed on Jan. 11, 1999, provisional application No. 60/509,735, filed on Oct. 7, 2003, provisional application No. 60/528,336, filed on Dec. 10, 2003, provisional application No. 60/528,986, filed on Dec. 12, 2003, provisional application No. 60/553,614, filed on Mar. 15, 2004.

(51) Int. Cl.
*G02B 5/28* (2006.01)
*G08B 25/00* (2006.01)

(52) U.S. Cl. .................. 359/589; 359/298; 359/307; 340/289.02

(58) Field of Classification Search ............... 359/589, 359/298, 307; 340/289.02
See application file for complete search history.

(56) References Cited

U.S. PATENT DOCUMENTS

| | | | |
|---|---|---|---|
| 6,577,080 B1 * | 6/2003 | Lys et al. | 315/362 |
| 6,897,624 B1 * | 5/2005 | Lys et al. | 315/297 |

* cited by examiner

*Primary Examiner*—Tuyet Thi Vo
(74) *Attorney, Agent, or Firm*—Choate, Hall & Stewart, LLP

(57) ABSTRACT

A system for and method of generating electromagnetic radiation in which the radiation has both a first and second utility. The electromagnetic radiation is modulated to produce electronically detectable variations to achieve the second utility, the variations not affecting the first utility. In one embodiment, the electromagnetic radiation is visible light. In this embodiment, the first utility is illumination and the second utility is the transmission of data. In another embodiment, the invention provides a lamp for generating visible light capable of providing illumination and transmitting data to a receiver. Any variations in the visible light resulting from the data transmission are imperceptible by a human eye regardless of the nature of the data being transmitted. In yet another embodiment, a power line carrier modem or wireless network may be used with the present invention to transmit information to the source.

18 Claims, 15 Drawing Sheets

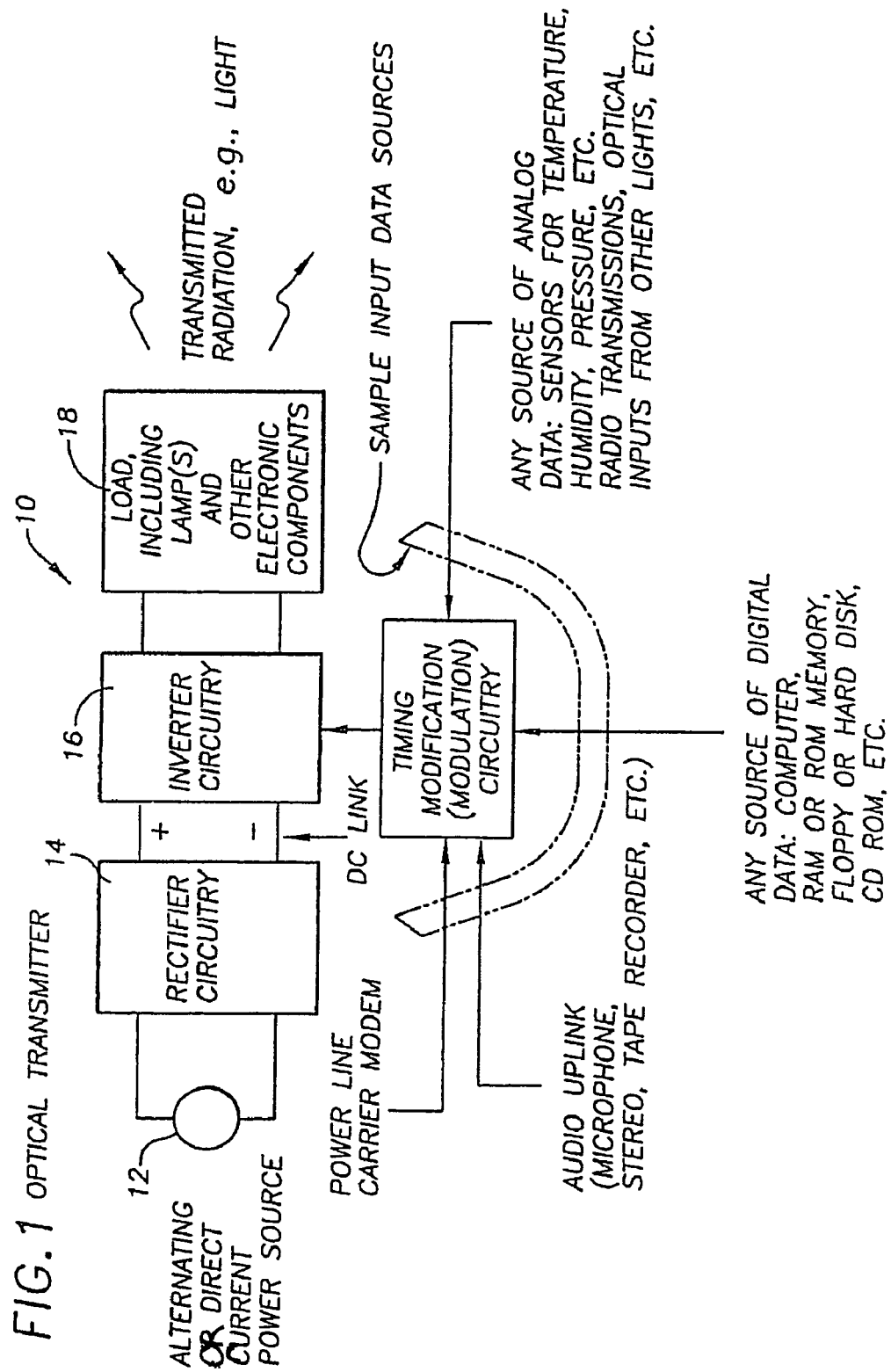

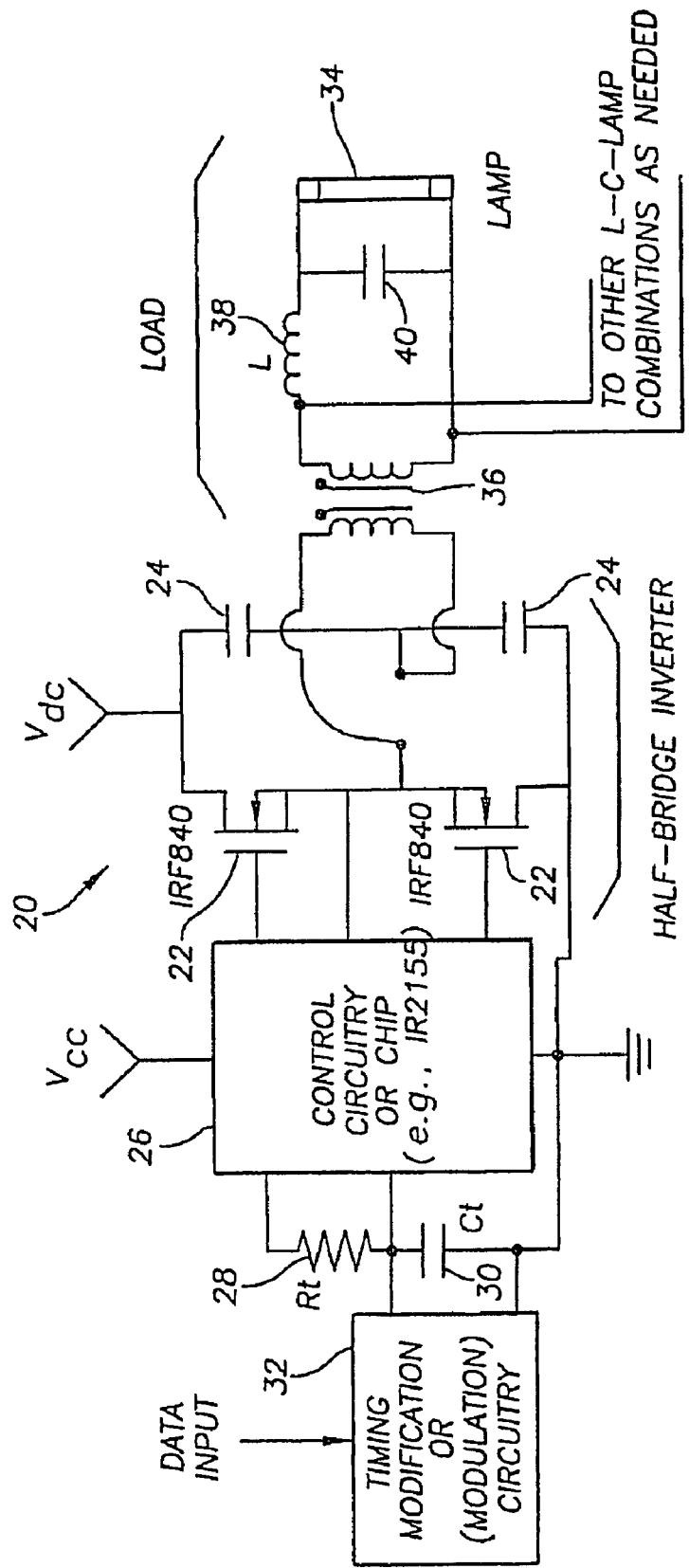
FIG. 2 HALF-BRIDGE INVERTER

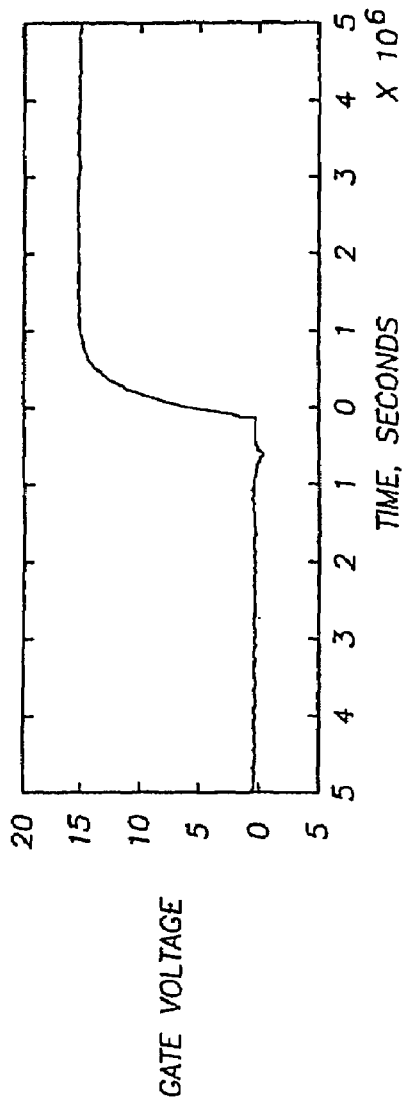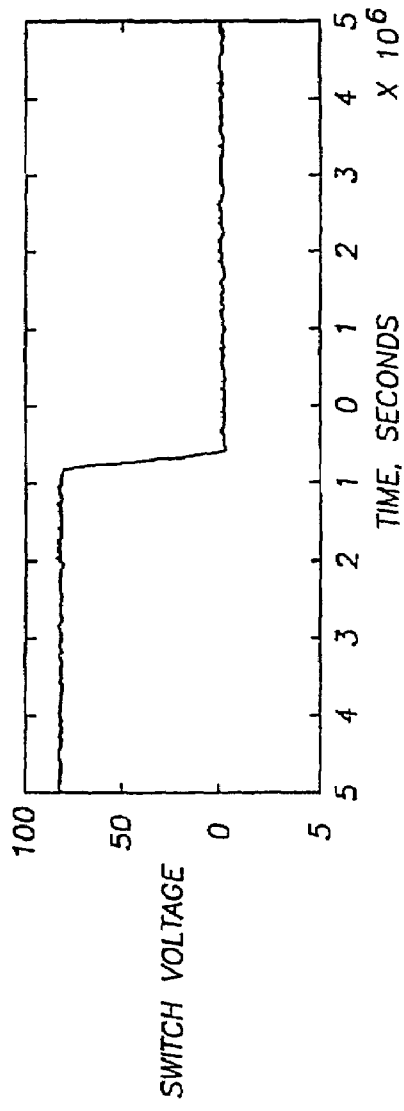

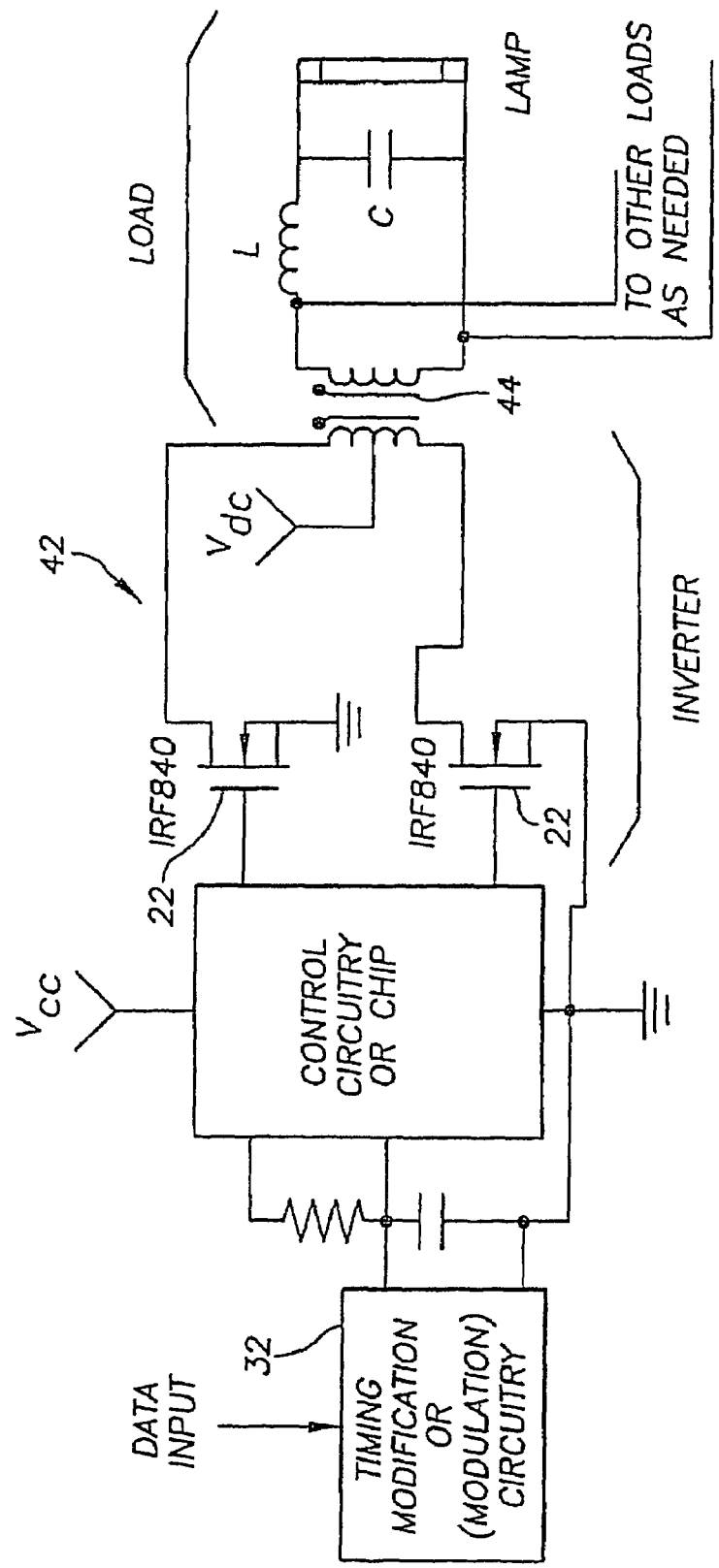
FIG. 4 ALTERNATE INVERTER CONFIGURATION

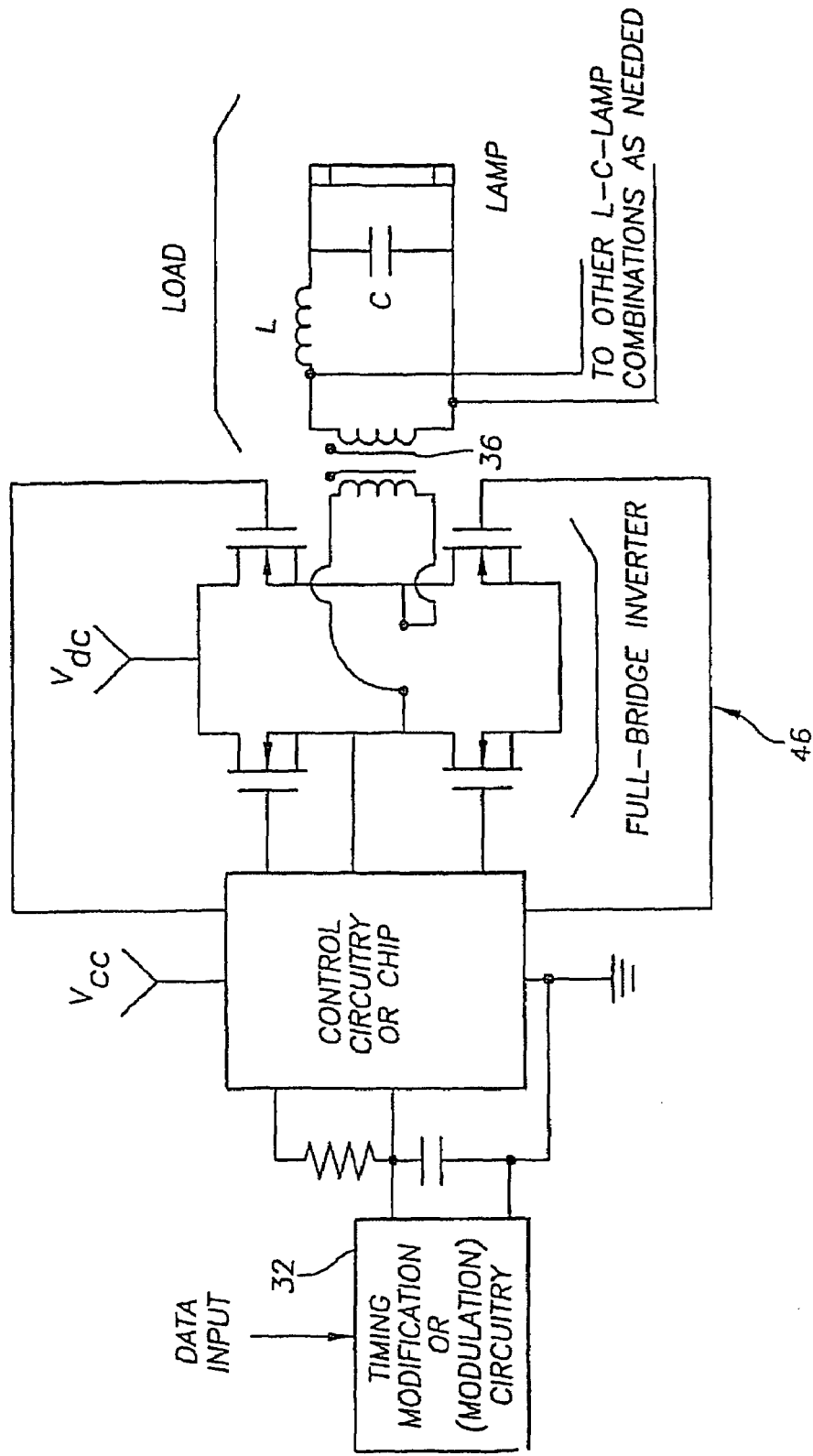
FIG. 5  ALTERNATE FULL-BRIDGE INVERTER CONFIGURATION

FIG. 6a  SAMPLE LOAD CONFIGURATIONS.
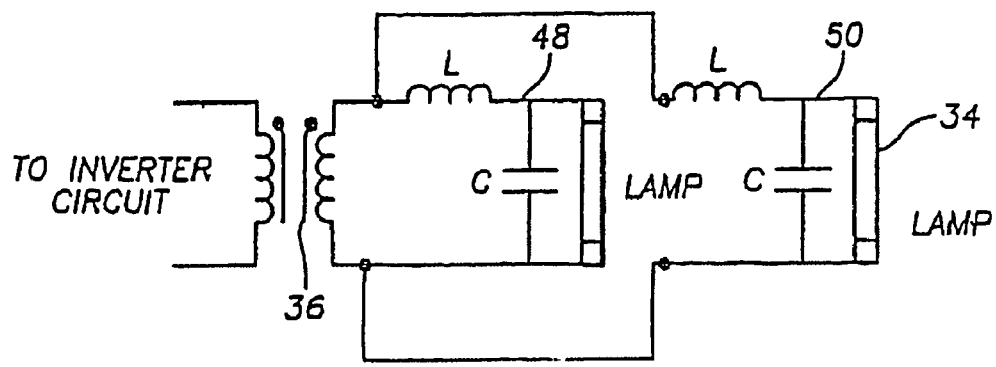
FIG. 6b  SAMPLE LOAD CONFIGURATIONS.
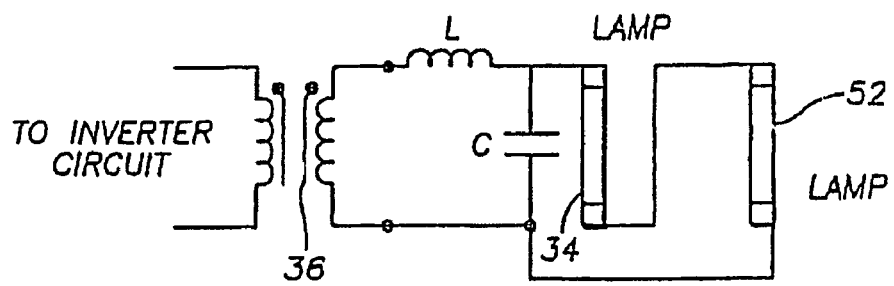
FIG. 6c  SAMPLE LOAD CONFIGURATIONS.
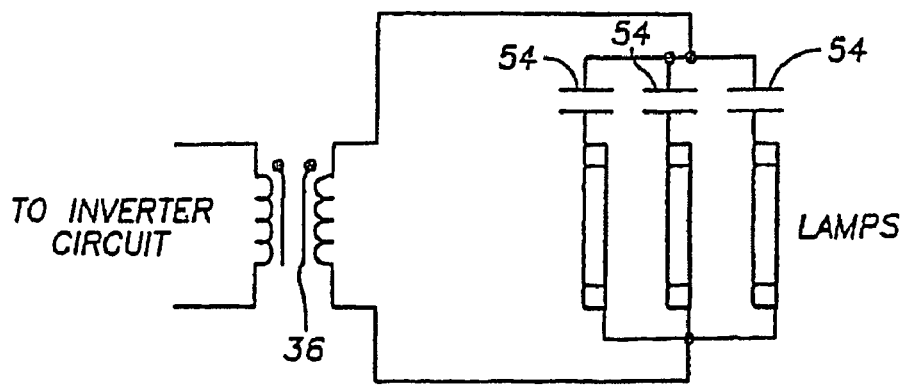

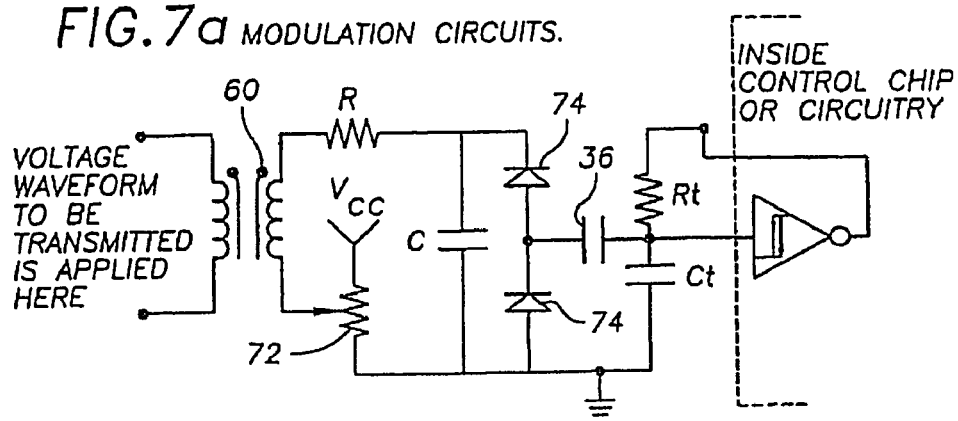
FIG. 7a MODULATION CIRCUITS.
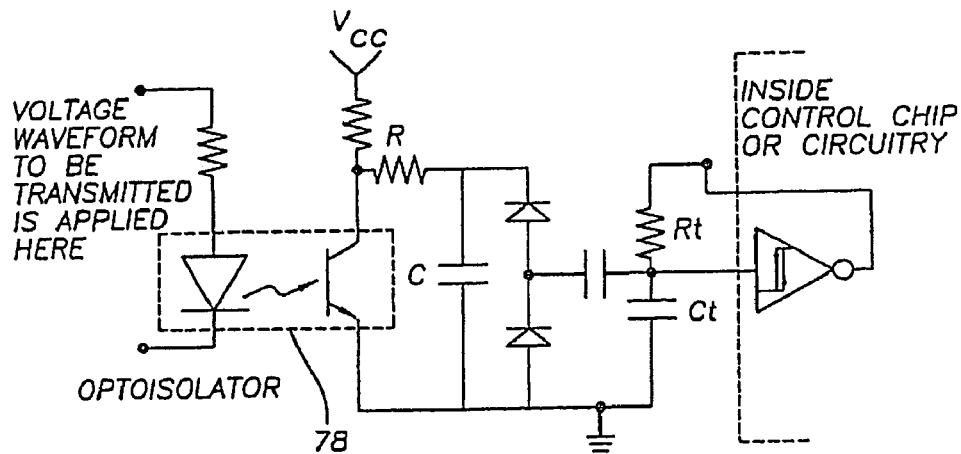
FIG. 7b MODULATION CIRCUITS.
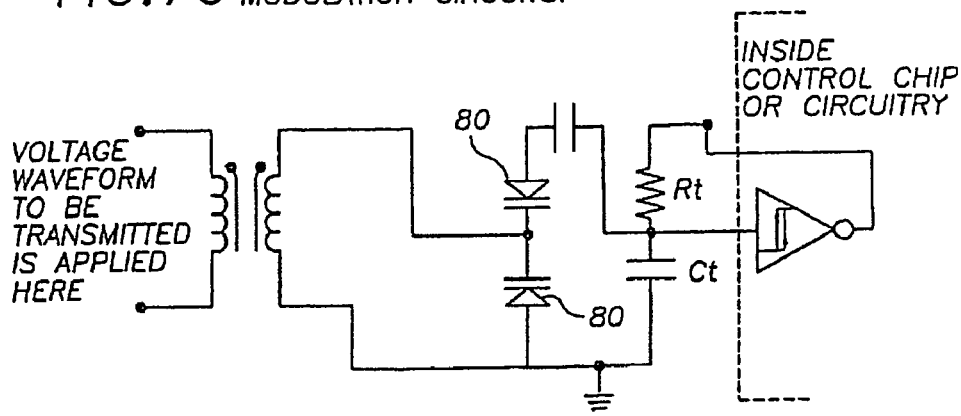
FIG. 7c MODULATION CIRCUITS.

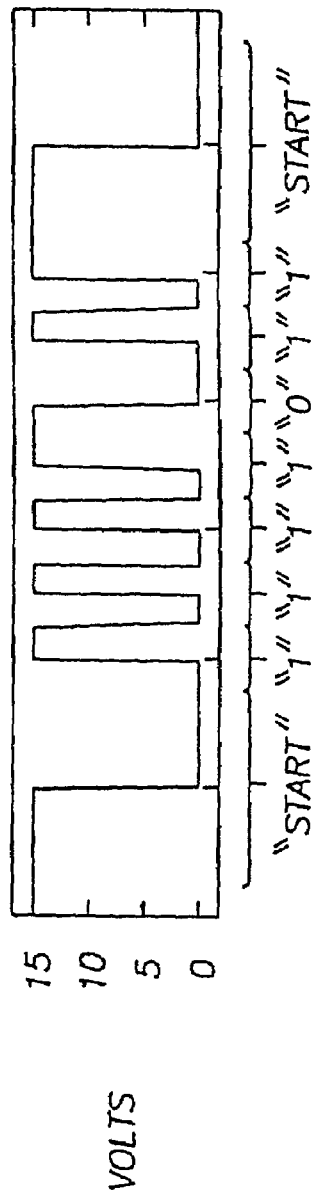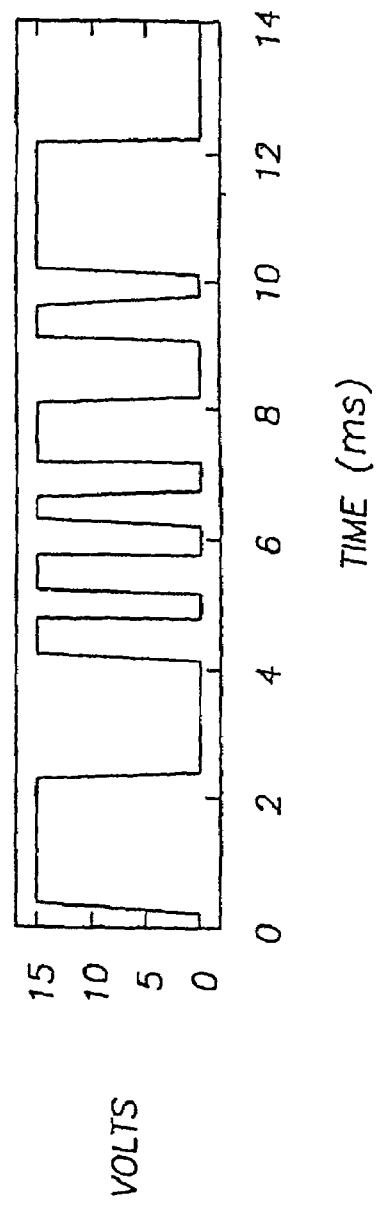
FIG. 11a
FIG. 11b

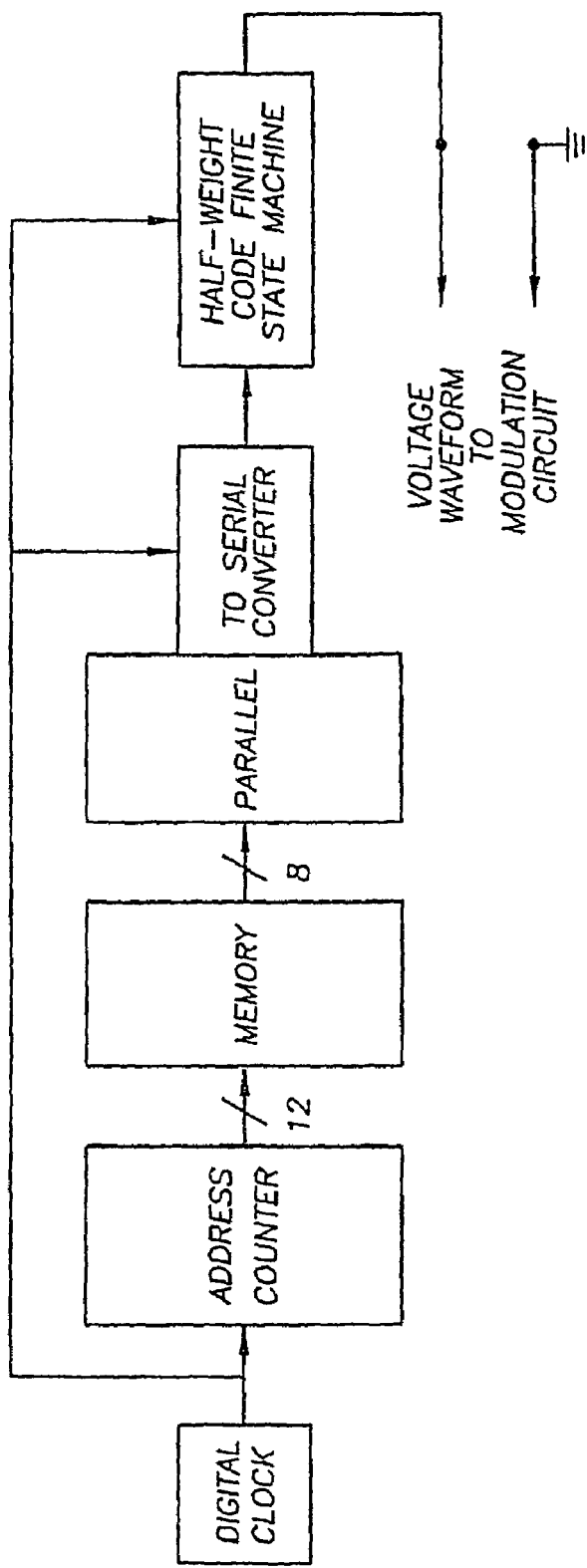
FIG. 12 DIGITAL DATA ENCODER.

COMMUNICATION WITH NON-FLICKERING ILLUMINATION

CROSS-REFERENCE TO RELATED APPLICATIONS

This application is a continuation-in-part of and claims priority to U.S. patent application Ser. No. 10/201,378 filed on Jul. 23, 2002 now U.S. Pat. No. 6,794,831, which claims priority to U.S. Provisional Patent Application 60/308,486 filed Jul. 25, 2001, U.S. Provisional Patent Application 60/311,037 filed Aug. 9, 2001, U.S. Provisional Patent Application 60/326,277 filed Oct. 1, 2001, U.S. Provisional Patent Application 60/338,912 filed Nov. 26, 2001, U.S. Provisional Patent Application 60/337,491 filed Nov. 26, 2001, U.S. Provisional Patent Application 60/341,191 filed Dec. 7, 2001, U.S. Provisional Patent Application 60/353,253 filed Feb. 1, 2002 and U.S. Provisional Patent Application 60/367,393 filed Mar. 25, 2002. Application Ser. No. 10/201,378 is a continuation-in-part of and claims priority to application Ser. No. 09/770,806 filed Jan. 26, 2001 now U.S. Pat. No. 6,426,599 issued Jul. 30, 2002 which claims priority to and incorporates by reference U.S. Provisional Patent Application 60/191,725 filed Mar. 24, 2000. Application Ser. No. 09/770,806 (U.S. Pat. No. 6,426,599) is a continuation of and claims priority to application Ser. No. 09/291,706 filed Apr. 14, 1999 now U.S. Pat. No. 6,198,230 issued Mar. 6, 2001 which claims priority to U.S. Provisional Patent Application 60/081,866 dated Apr. 15, 1998, 60/108,287 dated Nov. 13, 1998 and 60/115,374 dated Jan. 11, 1999, the contents of all of which are hereby incorporated herein by reference in their entirety. U.S. Pat. No. 6,198,230 incorporated by reference application Ser. No. 09/292,126 filed Apr. 14, 1999 now U.S. Pat. No. 6,504,633 issued Jan. 7, 2003 which claims priority to U.S. Provisional Patent Application 60/081,866 dated Apr. 15, 1998, 60/108,287 dated Nov. 13, 1998 and 60/115,374 dated Jan. 11, 1999.

This application is also a continuation-in-part of and claims priority to U.S. patent application Ser. No. 10/617,082 filed Jul. 10, 2003 which claims priority to and incorporates in their entirety by reference U.S. Provisional Patent Application 60/402,434 filed Aug. 9, 2002, 60/416,357 filed Oct. 4, 2002, 60/450,072 filed Feb. 25, 2003 and 60/476,876 filed Jun. 6, 2003. Application Ser. No. 10/617,082 is a continuation-in-part of and claims priority to U.S. patent application Ser. No. 10/161,458 filed on May 31, 2002 now U.S. Pat. No. 6,954,591, which is a continuation of and claims priority to U.S. Patent Application 09/291,709, filed Apr. 14, 1999, now U.S. Pat. No. 6,400,482, which claims priority to U.S. Provisional Patent Application 60/081,866 dated Apr. 1, 1998, 60/108,287 dated Nov. 13, 1998 and 60/115,374 dated Jan. 11, 1999, the contents of which are hereby incorporated by reference in their entirety.

This application claims priority to U.S. Provisional Patent Applications 60/509,735 filed Oct. 7, 2003, 60/528,336 filed Dec. 10, 2003, 60/528,986 filed Dec. 12, 2003, 60/553,614 filed Mar. 15, 2004 and U.S. Provisional Application 60/599,181 filed Aug. 5, 2004 with Express Mail Filing Receipt ER724999563US. All patents and patent applications mentioned above are incorporated herein in their entirety by reference.

FIELD OF THE INVENTION

The present invention relates to the simultaneous dual use of radiation, e.g. visible light, for both a conventional application, e.g., illumination, combined with the additional application of transmitting information without wires. The present invention further relates to electronic ballast circuits for electric discharge lamps, e.g., fluorescent lamps. The present invention further relates to the application of a time-varying, modulated current through the lamp to produce electronically detectable variations in the lamp light that are invisible to the human eye. The present invention further relates to coding information in variations in the lamp light for purposes of transmitting all kinds of information, including but not limited to, digital data, audio, textual, and graphical signals. The present invention further relates to efficient coding schemes to maximize the bandwidth or information capability of the optical data channel. Wide bandwidth and efficiency are critical for intranets or other wide area networks that could be carried on the lighting in an office or factory. The present invention further relates to efficient power electronic circuits capable of producing modulated currents in a lamp with high power efficiency, maximum data rate, and the possibility of incorporating needed safety features such as galvanic isolation. The present invention further relates to the construction of receivers for detection of the modulated information in the lamp light.

BACKGROUND OF THE INVENTION

Over half of the artificial light produced in the United States comes from lamps in which an electric discharge through a gas is used to produce illumination (J. Waymouth, *Electric Discharge Lamps*, MIT Press, Cambridge, Mass., 1971). The prevalence of electric discharge (e.g., fluorescent) illumination has led us to develop ways to inexpensively use discharge lamps for communication. The basic idea of using lighting to send information as well as to provide illumination appears to have originated at least as early as 1975 (M. Dachs, "Optical Communication System", U.S. Pat. No. 3,900,404, issued August 1975). Dachs discloses an analog amplitude-modulation (AM) scheme to modulate the arc current in a fluorescent lamp, the "carrier" signal, with an audio information signal. A more recent patent, "Boost-Mode Energization and Modulation Circuit for an Arc Lamp", U.S. Pat. No. 5,550,434 to King et al., issued August 1996, discloses an updated electronic circuit that also provides for AM modulation of the arc current with an analog signal. Such techniques are generally undesirable for the direct transmission of data since, among other reasons, low frequency content in the data may lead to perceptible flicker in the light output, and the noise immunity of the overall transceiver system is not optimal. Techniques for encoding digital information have been described in U.S. Pat. No. 5,657,145, issued August 1997 to Smith, "Modulation and Coding for Transmission using Fluorescent Lamp Tubes", and U.S. Pat. No. 5,635,915 issued June 1997 to Gray, "Transmission System", which employed either a pulsed AM or a phase modulation technique, respectively. Both techniques transmitted data at a rate that is on the same order of magnitude as that of the power-line frequency (50/60 Hz), i.e., relatively slowly compared to typical modem lamp arc frequencies in the range of 20,000 to 40,000 Hertz. Other communication schemes have also been proposed that do not use the lamp light as the carrier, but instead use the lamp fixture as an antenna for transmitting conventional radio wave or microwave signals. U.S. Pat. No. 5,424,859 issued June 1995 to Uehara, et al., "Transceiver for Wireless In-Building Communication Sytem [sic]", for example, discloses techniques for mounting a microwave antenna on the glass surface of fluorescent and incandescent lamps.

In T. Buffaloe, D. Jackson, S. Leeb, M. Schlecht, and R. Leeb, "Fiat Lux: A Fluorescent Lamp Transceiver," *Applied Power Electronics Conference*, Atlanta, Ga., June 1997 ("Buffaloe", which is incorporate here in its entirety by reference), the authors outlined the possibility of using pulse-code modulation to transmit data with a fluorescent lamp. This scheme made use of a tri-level pulse coding, which led to a ballast design with a relatively high-complexity compared to the architectures described in the present invention. Also, the associated receiver was more complicated, and unable to support the high data rates achievable with the present invention.

Previous efforts to use lighting for communication have not appreciated the need to select the coding scheme and control codes based on the data being transmitted. Rivollet (R. Rivollet. et. al., "*System and Method for transmitting messages*", WO98/02846, Jan. 22, 1998 which is included here in its entirety by reference) teaches a very complex coding scheme to avoid flicker in which two hexadecimal characters (requiring 8 bits (time periods) total) are required to send a single decimal data character from the message. Rivollet does not have the capability to send alphabetical characters. Rivollet also shows no understanding of the effect that control codes and start codes can have on flicker. U.S. Pat. No. 5,838,116, issued November 1998 to Katyl, et. al., "*Fluorescent Light Ballast with Information Transmission Circuitry*" (which is included herein in its entirety by reference), teaches that a simple pulse code modulation scheme will be sufficient since "the modulation occurs at a sufficiently high frequency so that it is imperceptible in the range of human vision.". However, as discussed above, Katyl does not understand or teach that the data must be analyzed and a proper coding method selected. Buffaloe uses a three-level coding scheme to attempt to avoid visible flicker. However, Buffaloe does not appreciate that the control codes and start codes also can create flicker. If the data stream were to contain a string of start codes using the scheme of Buffaloe to ensure reception of the start, the result would be visible flicker. Buffaloe does not teach or suggest the analysis of the data stream including the control codes and start codes in selecting the data coding scheme. None of these previous schemes involve analyzing the data to be transmitted including control and start codes and selecting the data coding scheme based upon the analysis of the nature of data.

The Applicants have invented a communication network based on frequency modulated radiation (e.g., visible light) that eliminates the disadvantages of the systems in the prior art. It enables higher power commercial scale lighting systems to be used to transmit the signal. It eliminates undesirable visual flicker in the system and so allows simultaneous continuous use of the lighting fixtures as lighting while also providing the medium for communication. It allows analog, digital or analog/digital data to be sent and received. It increases the bandwidth available to transmit data, and it enables a number of applications, such as multiple digital data streams, to be performed using a single lamp. Improvements made in the current invention can result in unprecedented performance advantages in the operation and implementation of lamp transceiver systems.

This invention is the first to propose establishing a transceiver system using any radiating transmitter with dual utility where the primary utility is any application, not just illumination but also possibly range finding, lane marking, or other applications, and the secondary utility is communication. This invention is the first to propose the transmission of bandlimited analog information such as audio signals by using frequency modulation, which enhances the noise immunity and available bandwidth over previous schemes while specifically avoiding sensory perceptible flicker in the transmission. It is the first to propose the efficient transmission of digital data using pulse code frequency modulation, and also the first to propose encoding digital bits in sidebands around the carrier frequency of the transmitter. It is the first to propose the use of a nonlinear detector in a dual-use network receiver to improve settling and detection time of pulse-coded data. These schemes for the transmission and reception of digital data substantially enhance the available data transmission rate in comparison to schemes in the prior art, again while eliminating perceptible flicker. It is the first to disclose schemes for creating multiple data transmission channels using the same transmitter, and the first to propose a receiver in a "dual-use" network capable of selecting one channel from a spectrum of available choices. It is the first to propose a receiver with variable "lock-in" or transmitter capture characteristics, allowing the tailoring of the behavior of the receiver as it locks on to different transmitters. This feature could be especially important for optimizing the receiver's behavior in way-finding applications, and in environments with many different closely spaced transmitters, to ease the process of acquiring and holding a data channel between the transmitter and receiver.

This patent application incorporates by reference in their entirety the following patents, patent applications and other documents and all the references included or mentioned in this application or in each of these references:

S. B. Leeb, G. B. Hovorka, D. Jackson and E. C. Lupton, "Dual Use Electronic Transceivers for Wireless Data Networks", U.S. Pat. No. 6,198,230, issued Mar. 6, 2001;

E. C. Lupton, S. B. Leeb, G. B. Hovorka, D. Jackson and B. L. Bentzen, "Communications Systems" U.S. Pat. No. 6,400,482, issued Jun. 4, 2002;

S. B. Leeb, "Dual Use Electronic Transceivers for Wireless Data Networks", U.S. Pat. No. 6,426,599, issued Jul. 30, 2002;

G. B. Hovorka, S. B. Leeb, D. K. Jackson and E. C. Lupton, "Analog and Digital Receivers for Dual Use Wireless Data Networks", U.S. Pat. No. 6,504,633, issued Jan. 7, 2003;

E. C. Lupton, S. B. Leeb, G. B. Hovorka and D. Jackson, "Communications Systems", WO00/30415, issued May 25, 2000;

S. B. Leeb, G. B. Hovorka, E. C. Lupton, R. T. Hinman, B. L. Bentzen, R. D. Easton, and L. Lashell, "Assistive Communication Systems for Disabled Individuals using Visible Lighting," 15th International Conference on Technology and the Disabled, Mar. 24, 2000;

D. T. Burke, S. B. Leeb, R. T. Hinman, E. C. Lupton, J. Burke, J. C. Schneider, B. Ahangar, K. Simpson, E. A. K. Mayer, "Using Talking Lights to Assist Brain-Injured Patients with Daily Inpatient Therapeutic Schedule", J. Head Injury Trauma, 16, 3, 284–291 (2001);

R. T. Hinman, S. B. Leeb., A. Avestruz, E. C. Lupton, B. L. Bentsen, R. Easton, "Dual Use Lighting for Assistive Communications", 2002 NSF Design, Service and Manufacturing Grantees and Research Conference, January 2002 (on CD);

D. T. Burke, S. B. Leeb, R. T. Hinman, E. C. Lupton, J. Burke, J. C. Schneider, B. Ahangar, K. Simpson, E. A. K. Mayer, "Using Talking Lights to Assist Brain-Injured Patients with Daily Inpatient Therapeutic Schedule", J. Head Injury Trauma, 16, 3, 284–291 (2001);

A. Avestruz, E. C. Lupton, R. T. Hinman, S. B. Leeb and A. Culkin, "Smart Markers for In-Depth Battlefield Information: Optical and Hybrid Communication", 23$^{rd}$ Army Science Conference, Orlando Fla., December 2002;

A. Avestruz, E. C. Lupton, R. T. Hinman, S. B. Leeb and G. Livshin, "Smart Markers for In-depth and Perimeter Security Information using Optical and Hybrid Communications", IEEE Conference on Technologies for Homeland Security, Spring 2003;

G. Livshin, A. Avestruz, R. T. Hinman, S. B. Leeb and E. C. Lupton, "Context Aware Security Based On Illumination (CASI)"; IEEE Conference on Technologies for Homeland Security, Spring 2003;

R. T. Hinman, A. Avestruz, E. C. Lupton, G. Livshin, J. I. Rodriguez, S. B. Leeb, C. Clark, K. J. Horvath and L. Volitzer, "Illumination Based Locator Assists Alzheimer's Patients", IEEE Pervasive Computing, April–June 2004, 49 (2004);

R. T. Hinman, E. C. Lupton, S. B. Leeb, A. Avestruz, R. Gilmore, D. Paul and N. Peterson, "Using Talking Lights Illumination Based Communication Networks to Enhance Word Comprehension in Subjects who are Deaf or Hard-of-Hearing", Am. J. Audiology, June 2003, 17–23;

G. B. Hovorka, S. B. Leeb, D. Jackson and E. C. Lupton, "Analog and Digital Electronic Transceivers for Dual-Use Wireless Data Networks", PCT Application WO99/53633, Oct. 21, 1999;

S. B. Leeb, G. B. Hovorka, D. Jackson and E. C. Lupton, "Dual-Use Electornic Transceiver set for Wireless Data Networks", PCT Application WO99/53732, Oct. 21, 1999;

D. K. Jackson and S. B. Leeb, "Fluorescent Lamp Digital Transceiver" U.S. Provisional Patent Application 60/081,866, filed Apr. 15, 1998;

D. K. Jackson, et. al., "Fiat Lux, A Fluorescent Lamp Transceiver", IEEE Transactions on Industrial Applications, vol. 34, No. 3, pp 625–630, May/June 1998;

G. B. Hovorka, S. B. Leeb, E. C. Lupton and D. K. Jackson, "Visible Lighting Communication System", U.S. Provisional Patent Application 60/108,287, filed Nov. 13, 1998;

G. B. Hovorka, S. B. Leeb and E. C. Lupton, "Visible Lighting Communication System II", U.S. Provisional Patent Application 60/115,374, filed Jan. 11, 1999;

S. B. Leeb, G. B. Hovorka, D. Jackson and E. C. Lupton, "Dual Use Electronic Transceivers for Wireless Data Networks", U.S. patent application Ser. No. 09/291,76, Apr. 14, 1999;

G. B. Hovorka, S. B. Leeb, D. Jackson and E. C. Lupton, "Analog and Digital Electronic Transceivers for Dual-Use Wireless Data Networks", U.S. patent application Ser. No. 09/292,126, filed Apr. 14, 1999;

E. C. Lupton, S. B. Leeb, G. B. Hovorka and D. Jackson, "Communications Systems", U.S. patent application Ser. No. 09/291,709, filed Apr. 14, 1999;

E. C. Lupton, S. B. Leeb, G. B. Hovorka and D. Jackson, "Communication System," U.S. patent application Ser. No. 10/161,458, filed Mar. 31, 2002;

S. B. Leeb, D. K. Jackson, E. C. Lupton, and G. B. Hovorka, "Non-flickering Illumination Based Communication," U.S. patent application Ser. No. 10/201,378, filed Jul. 23, 2002;

S. B. Leeb, et al., "Hybrid Optical Wireless Network" U.S. patent application Ser. No. 10/617,082, filed Jul. 10, 2003;

S. B. Leeb, R. T. Hinman, G. B. Hovorka and E. C. Lupton, "Communication Networks," U.S. Provisional Patent Application 60/191,725, filed Mar. 24, 2000;

A. Avestruz, R. T. Hinman, S. B. Leeb and E. C. Lupton, "Hybrid Wireless Network", U.S. Provisional Patent Application 60/308,486, filed Jul. 25, 2001;

A. Avestruz, S. B. Leeb, R. T. Hinman and E. C. Lupton, "Multi-Element Assistive Network," U.S. Provisional Patent Application 60/311,037, filed Aug. 9, 2001;

R. T. Hinman, S. B. Leeb, A. Avestruz and E. C. Lupton, "Dual Use Lighting for Assistive Communications," U.S. Provisional Patent Application 60/326,277, filed Oct. 1, 2001;

R. T. Hinman, S. B. Leeb, A. Avestruz and E. C. Lupton, "Modulated Lighting," U.S. Provisional Patent Application 60/338,912, filed on Nov. 26, 2001;

R. T. Hinman, S. B. Leeb, A. Avestruz and E. C. Lupton, "Spread Spectrum Arc Lighting Communication," U.S. Provisional Patent Application 60/337,491, filed on Nov. 26, 2001;

S. B. Leeb, R. T. Hinman, A. Avestruz and E. C. Lupton, "Vehicle Guidance," U.S. Provisional Patent Application 60/341,191, filed on Dec. 7, 2001;

S. B. Leeb, E. C. Lupton, D. K. Jackson, G. B. Hovorka and B. L. Bentzen, "Optical Communications," U.S. Provisional Patent Application 60/353,253, filed on Feb. 1, 2002;

A. Avestruz, R. T. Hinman, S. B. Leeb and E. C. Lupton, "Incandescent Light Optical Communication," U.S. Provisional Patent Application 60/367,393, filed on Mar. 25, 2002;

R. T. Hinman, S. B. Leeb, A. Avestruz and E. C. Lupton, "Communication via Modulated Illumination," U.S. Provisional Patent Application 60/402,434, filed on Aug. 9, 2002;

A. Avestruz, S. B. Leeb, R. T. Hinman and E. C. Lupton, "Lighting Communication Point," U.S. Provisional Patent Application 60/416,357, filed Oct. 4, 2002;

G. Livshin, A. Avestruz, R. T. Hinman, S. B. Leeb and E. C. Lupton, "Context Aware Security through Illumination," U.S. Provisional Patent Application 60/450,072, filed Feb. 25, 2003;

G. Livshin, E. C. Lupton, R. T. Hinman, S. B. Leeb, and A. Avestruz, "Context Aware Assistive Network," U.S. Provisional Patent Application 60/476,876, filed Jun. 6, 2003;

S. B. Leeb, R. Hinman, E. C. Lupton, A. Avestruz and G. Livshin, "Building Energy Conservation, Optimization Network," U.S. Provisional Patent Application 60/509, 735, filed Oct. 7, 2003;

J. Rodriguez, G. Livshin, E. C. Lupton, R. T. Hinman, S. B. Leeb and A. Avestruz, "Multiple Device Wireless Network", U.S. Provisional Patent Application 60/528,336 filed Dec. 10, 2003;

J. Rodriguez, G. Livshin, E. C. Lupton, R. T. Hinman, S. B. Leeb and A. Avestruz, "Context Aware Multiple Device Wireless Network", U.S. Provisional Patent Application 60/528,986 filed Dec. 12, 2003;

A. Avestruz, J. Rodriguez, R. T. Hinman, G. Livshin, E. C. Lupton, S. B. Leeb, "Active Rejection Circuits", U.S. Provisional Patent Application 60/553,614 filed Mar. 15, 2003; and G. Livshin, J. Rodriguez, R. T. Hinman, E. C. Lupton, S. B. Leeb and A. Avestruz, "Context Aware Networks" U.S. Provisional Patent Application, filed Aug. 5, 2004 on Express Mail Label ER 724999563US.

SUMMARY OF THE INVENTION

In one aspect, the invention is an apparatus for generating electromagnetic radiation in which the radiation has both a first and a second utility. The electromagnetic radiation is modulated to produce electronically detectable variations to achieve the second utility, the variations not affecting the first utility. In one embodiment, the second utility is transmission of information. In this embodiment, the electromagnetic radiation is visible light in which the first utility is illumination and the second utility is the sending of information, the variations in the visible light being invisible to the human eye. Suitable apparatus is a lamp which may, for example, be a fluorescent, cold cathode or a high-intensity discharge lamp. Any transmitter of radiated energy could be used, however, including light emitting diodes, lasers or radio wave antennas.

In another aspect, the invention is a lamp for generating visible light to provide illumination and to transmit information to a receiver in which the variations in the light as a result of the information transmission are undetectable to the human eye. The lamp includes a source of visible light and circuitry including a ballast for modulating the output of the source to send information by means selected from the group including analog FM, sideband encoded digital pulse code FM, discrete pulse code FM with two level coding, and any other orthogonal bit coding scheme. The circuitry may further include a rectifier for drawing power from an AC source and controlling the power to have substantially the same shape and phase, but possibly different amplitude, as the AC source to insure near-unity-power-factor operation. An inverter is connected to receive power from the rectifier to create a high frequency alternating wave form, the output of the inverter forming an input to the lamp. It is preferred that the inverter include means for varying the frequency of the voltage produced by the inverter. It is also preferred that the inverter is operated with zero-voltage or zero current switching.

In another aspect, the present invention is a method of designing and constructing of a system which, by design, does not flicker. The inventors have demonstrated that the visual observation of flickering in a light which is transmitting data is a function of the data being transmitted. As an example, a simple pulse code modulation system used to transmit digital information might not display visible flickering if the code being sent is alternating digital 1s and 0s. However, if the message is a string of 1s followed by string of 0s, flicker will be observed. On the other hand, if a two level Manchester type code is used to transmit the data, then flicker will not be observed even if the data does include a string of 1s followed by a string of 0s. Analyzing the nature of the data which will be transmitted enables the system designer to select appropriate hardware and a coding scheme to transmit the data without visible flicker. At the same time, a designer can avoid an unnecessarily complex coding scheme that has a slower data rate than could be achieved because some of the data carrying capability of the hardware is consumed in an unnecessarily complex code. If, for example, the analysis of the data to be transmitted concludes that there is not a string of 1 s followed by a string of 0s or a string of 0s followed by a string of 1s, then the simple pulse code modulation scheme would be perfectly satisfactory and the data rate could be doubled (since each bit transmitted in Manchester code requires two changes in lamp frequency.) The inventors have determined that one must consider the nature of the data in selecting system hardware and a data coding scheme in order to avoid flicker.

It is not sufficient to consider only the data itself in the analysis; one must also consider control codes like message start codes. Control codes and start codes are an essential part of transmission of messages. The data must be analyzed and a proper coding method selected, because control codes and start codes also can create flicker.

A similar analysis of data can be useful when analog frequency modulation is used to transmit data. For example, for a light transmitting around a nominal 30 kHz carrier frequency with analog frequency modulation, ordinary radio talk i.e. band limited voice signals; will not cause visible flicker when the degree of modulation is 10 kHz (20 kHz to 40 khz) but when percussion music is transmitted, the result is flicker. This flicker can be eliminated by confining the degree of modulation to 5 kHz (25 kHz to 35 kHz).

In particular, the present invention pertains, in part, to electronic circuits capable of controlling and modulating the arc current in a lamp. The circuits include means to draw power from a direct or alternating (utility) source. The circuits further include means to control or limit the magnitude of the current flowing in a lamp or collection of lamps. The circuits further include means to vary the current in the lamp to encode information in the lamp light with no visible flicker.

By "lamp" as that term is used herein, it is meant a device that produces radiated transmissions, including, but not limited to, infra-red, visible, and ultra-violet light, in response to an input electrical current which flows in the lamp. A typical example is a fluorescent lamp, although other types, such as high-intensity discharge lamps, light emitting diodes, lasers, cathode ray tubes, particle beam emitters, liquid crystal displays, electroluminescent panels, klystrons, and masers are also intended. Emitters of other types of radiation, such as radio antennae for applications in RADAR sets, ultrasonic transducers, and mechanical fans ("radiating" air or water for instance) are also intended.

By "ballast" as that term is used herein, it is meant a circuit that controls the amplitude, frequency, and phase of the current waveform in the lamp.

By "rectifier", as used herein, it is meant a circuit that takes as input a voltage waveform from a power source and produces a DC or predominantly DC output voltage waveform.

By "inverter" as used herein, it is meant a circuit that takes as input a low frequency or DC electrical voltage waveform from a power source. The inverter produces a high frequency voltage waveform that can be applied to the lamp, or a lamp in combination with other electrical components such as inductors or capacitors. The frequency and phase of this output voltage waveform can be controlled by the inverter.

By "switch" as used herein, it is meant a device that can either block or permit the flow of electric current in response to a low-power-level control signal. Typical examples of a switch include a bipolar junction transistor, a MOSFET, or an insulated-gate bipolar junction transistor (IGBT).

By "load" as used herein, it is meant a lamp or lamps, possibly in combination with other electrical components including inductors, capacitors, resistors, and transformers, which are added to ensure that proper and safe operating voltages and currents are, or can be by virtue of control actions taken by the inverter, applied to the lamp or lamps. Typically, the load is connected to the output of an inverter.

In one embodiment of the invention, a system that is capable of controlling the current in a discharge or fluorescent lamp is provided. A rectifier circuit is used to draw power from the AC utility. The current drawn from the AC utility by the rectifier circuit is actively controlled to have the same shape and phase, but possibly a different amplitude, as the AC utility voltage waveform, ensuring near-unity-power-factor operation. The power drawn from the AC utility is used to create a predominantly DC output voltage with little alternating or ripple voltage. This DC voltage serves as the input to an inverter circuit.

The inverter circuit draws power from the DC bus and creates a high frequency alternating waveform that can be applied to the lamp, or the lamp in combination with other electrical components including transformers, inductors, or capacitors. For example, the inverter can be used to apply an AC square wave to the primary of a transformer whose secondary is connected to a series combination of an inductor and a capacitor and lamp in parallel. The inverter circuit includes special means to vary the frequency of the voltage produced by the inverter circuit. The frequency can, for example, be varied to encode information in the output voltage waveform and, therefore, the light produced by the lamp. To maximize efficiency, the inverter is operated with zero-voltage switching. For example, switches are turned on only when the voltage across the switch is zero, ensuring a nearly lossless turn-on transition.

In another embodiment, the inverter circuit could be energized directly by a DC or low frequency alternating power source, eliminating the need for a rectifier circuit. This mode of operation is particularly attractive in environments, e.g., automobiles or other transportation systems, where DC power is available a priori Again, the inverter circuit includes special means to vary the frequency of the voltage produced by the inverter circuit. The frequency can, for example, be varied to encode information in the output voltage waveform and, therefore, the light produced by the lamp. Again, to maximize efficiency, the inverter is operated with zero-voltage switching. For example, switches are turned on only when the voltage across the switch is zero, ensuring a nearly lossless turn-on transition.

In either case, a receiver can be constructed which remotely samples the lamp light from a distance and decodes the information in the light encoded by the ballast.

BRIEF DESCRIPTION OF THE DRAWING

FIG. 1 is a schematic illustration of an embodiment of a system in accordance with the invention.

FIG. 2 is an electronic schematic diagram of a high frequency half-bridge inverter which may be used to drive a load.

FIGS. 3a and 3b are oscilloscope traces illustrating the gate drive and switch voltage waveforms in an inverter operated with zero-voltage switching (ZVS).

FIG. 4 is an electronic schematic diagram of a high frequency half-bridge inverter driving the primary of a center-tapped transformer whose secondary may be used to drive a load.

FIG. 5 is an electronic schematic diagram of a high frequency full-bridge inverter which may be used to drive a load.

FIGS. 6a, 6b, and 6c are schematic diagrams of possible load configurations.

FIGS. 7a, 7b and 7c are schematic diagrams of three possible modulation circuits for modifying the operating frequency of the inverter circuit.

FIGS. 11a and 11b are graphs that show a comparison of sent and received encoded bits respectively in a prototype system.

FIG. 12 is a block diagram showing a finite-state machine that could be used to encode digital data transmission through the modulation circuits.

DETAILED DESCRIPTION OF CERTAIN PREFERRED EMBODIMENTS OF THE INVENTION

Figure 8:
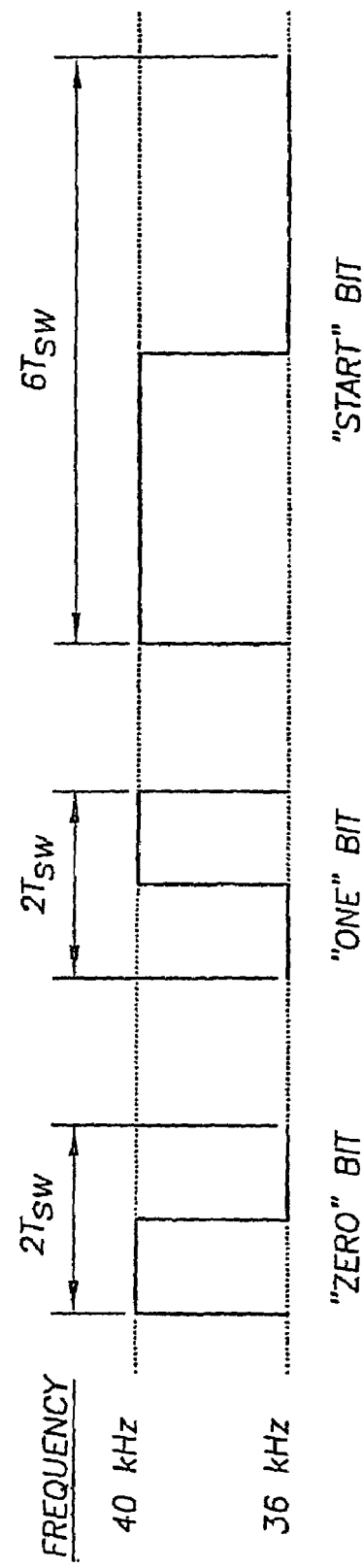
FIG. 8 is a graphical representation of a half-weight bit pattern.

The present invention transmits information over a free space optical data pathway. Transmission is accomplished by modulating or varying the frequency of the alternating current in an electric discharge lamp such as a fluorescent lamp. A typical discharge lamp requires a relatively high starting or striking voltage across it's terminals to form an arc or electric discharge in the lamp. Once the arc forms, it is essential to reduce the voltage across the lamp, lest an excessive current flow through the lit lamp, destroying it. The purpose of an electronic lamp ballast is at least two-fold, therefore. The ballast must provide an adequately high voltage to initiate arc formation and light production. After starting, the ballast serves to limit the current through the lamp, ensuring satisfactory light production and long lamp life. The present invention adds a third function to the ballast. A means is provided to vary the frequency of the lamp current to encode information for transmission in the lamp light. An overview of this new ballast is shown in FIG. 1. Ballast 10 draws power from an alternating or direct current electric power source 12. This power is processed by a rectifier pre-regulator circuit 14, which may perform several functions, including actively wave-shaping the input current to provide near-unity-power factor operation. The rectifier 14 also provides a DC output voltage or DC link that serves as the input to the next stage in the ballast 10, an inverter 16. It should be noted that there are a wide range of possibilities for implementing this rectifier stage, including actively controlled pre-regulator circuits designed around well known power electronic switching power supplies such as the buck, boost, or flyback converters (not shown). This stage might or might not provide safety isolation by incorporating a transformer, as needed. It might also be a very simple stage, consisting of as little as a capacitor or simply a pair of connecting wires if the ballast is to operate from a DC source voltage, as might be the case in a transportation system such as an automobile or bus, where a 12 volt DC supply may be conveniently available, for example.

The inverter circuit 16 operates from the DC link voltage provided by the rectifier 14. The inverter 16 acts to create a high-frequency AC voltage waveform to be applied to a load circuit 18 that includes one or more lamps. There are a tremendous number of inverter circuit topologies and switching schemes that could be used for this application. One possibility, for example, is shown in FIG. 2. A half-bridge inverter 20 shown in the figure consists of two IRF840 MOSFETs 22 and two capacitors that divide the DC link voltage, $V_{dc}$. A control circuit 26 acts to activate first the bottom MOSFET, and then the top MOSFET, and then repeats this pattern. One complete cycle of the pattern will be called a switch period. A wide range of chips or circuits could be used to control the two MOSFETs in the inverter 20. One possibility, for example, would be to use the IRF2155 half-bridge control circuit 26, which contains drivers for the MOSFETs and a built in timing circuit to determine the time interval that constitutes a switch period. This interval can be controlled by the ballast designer in the case of the IR2155 control chip by selecting the values of the resistor Rt 28 and the capacitor Ct 30. A critical innovation in the present invention is the addition of modulation circuitry 32 to modify the behavior of the timing circuitry to permit frequency modulation of the inverter AC waveform for the purpose of encoding information for transmission at the highest possible bandwidth or data rate while ensuring that the lamp 34 light exhibits no perceptible flicker regardless of the information content of the transmitted data. This information could come from any source of analog or digital waveforms, as shown in FIG. 1, including, for example, audio signals from a tape recorder or microphone or digital data from a computer, disk drive, or power line carrier modem.

The inverter block 16 shown in FIG. 1, and illustrated as a half-bridge circuit 20 in FIG. 2, is used to drive a load circuit that consists of the lamp 34 and possibly other electronic elements such as inductors, capacitors, and/or transformers. A specific example is shown in FIG. 2, in which the load consists of a transformer 36 driving a series combination of an inductor 38 and the parallel combination of a capacitor 40 and the lamp 34. The transformer 36 can provide at least two important functions. It may provide galvanic safety isolation, especially if the rectifier circuit 14 that provides Vdc does not incorporate means for isolating the circuit. It may also provide a change in the voltage level from the primary winding (driven by the inverter) to the secondary winding (connected to the inductor, capacitor, and lamp) in order, for instance, to enhance available striking voltage. The inductor 38 and capacitor 40 in this load serve as a high-Q resonant circuit when the lamp 34 is off, i.e., before the arc strikes, which can also provide significant striking voltage if the inverter frequency is near the resonant frequency. Once the lamp 34 strikes, the lamp 34 effectively dominates the combined impedance of the capacitor/lamp pair, and the inductor serves to limit the current flowing through the lamp in steady-state operation.

The two MOSFETs 22 in the inverter must never be turned on simultaneously, in order to avoid short circuiting the input voltage $V_{dc}$. If a delay is left by the control circuit between the time that one switch is turned off and the next switch is turned on, it is possible to operate the inverter with highly efficient, zero-voltage switched turn on transitions. This is illustrated in our experimental prototype by the waveforms shown in FIGS. 3a and 3b. The top oscilloscope photo of FIG. 3a shows the delay between the activation signal for the top MOSFET and the bottom MOSFET. The bottom oscilloscope photo of FIG. 3b shows that the drain-to-source voltage on the bottom MOSFET, for example, rings to zero volts and is clamped by the MOSFET body diode before the bottom MOSFET is turned on by its control signal. In the half-bridge inverter, ZVS is ensured by leaving a delay between the switch activations and by ensuring that the inductor 38 is large enough to store sufficient energy to ring the drain-to-source voltage to zero.

Two of an innumerable number of possible configurations for an inverter circuit are shown in FIGS. 4 and 5. In FIG. 4, an inverter 42 has been modified to include a center-tapped transformer 44. This configuration has the advantage of allowing both MOSFET control gates 22 to be driven with respect to ground. However, it also raises the complexity of the transformer manufacturing by requiring a center-tapped primary. In FIG. 5, an inverter 46 has been modified to be a full-bridge, four switch inverter. This circuit has the advantage of applying the full voltage $V_{dc}$, as opposed to $V_{dc}/2$ in the half-bridge, making it potentially easier to develop a high striking voltage. However, it also requires four switches and possibly four control lines from the control circuitry.

These inverter configurations all typically drive the load with a predominantly sinusoidal arc current. Other inverter configurations could be used, at the risk of increasing the lamp current crest factor, to drive a current consisting of the sum of two or more distinct carrier frequency sinusoids. Each of these sinewaves could be modulated with a different information signal, enabling the possibility of using a single lamp to send multiple channels of information, for which a receiver could individually tune and detect.

Three different example load configurations, again from an almost innumerable number of variations, are illustrated in FIGS. 6a, 6b and 6c. In each of the three cases, it is assumed that the load is driven by the high frequency output of some inverter circuit. The load configuration in FIG. 6a illustrates the use of a single transformer 36 to drive multiple L-C-Lamp circuits 48,50, permitting a multi-lamp fixture and ballast. The load circuit of FIG. 6b also permits the operation of multiple lamps 34,52 by connecting the lamps in series. This configuration minimizes the need for additional inductors and capacitors, but requires a high transformer turns ratio and/or high-Q L-C circuit to provide the high striking voltage needed to activate a series combination of lamps. Also, in this configuration, if a single lamp fails, the entire fixture (both lamps 34,52 in the figure, for example) will cease to produce light.

The third circuit shown in FIG. 6c can be used to activate one or more lamps in parallel. The capacitors 54 serve as ballasting or current limiting elements, and striking voltage is provided by a transformer with a sufficient turns ratio to provide high voltage to the lamp/capacitor combinations. This configuration requires a transformer 36 with a high turns ratio, and has the advantage that the failure of one lamp will generally not interfere with the operation of the other, parallel lamp circuits. Note that other enhancements, such as the addition of a positive-temperature coefficient thermistor (not shown) in parallel with each lamp, might be made in any of the load configurations to enhance starting and prolong cathode life.

In a multi-lamp fixture, notice that several configurations are possible. As shown in FIGS. 6a, 6b and 6c, several loads could be connected to the same inverter, increasing the total radiated power of a particular signal. It is understood, however, that individual lamps in a multi-lamp fixture could be connected to one of several inverter circuits with different modulation inputs. In this case, a single lighting fixture could be used to transmit data on multiple channels.

At the heart of the invention is some circuit means to enable frequency modulation or pulse code frequency modulation of the lamp 34 light. For purposes of illustration, it is assumed that the switch period is determined by the action of a hysteresis oscillator, as is found in the IR2155 or the classic 555 timer circuit. A hysteresis comparator or set of comparators is included in the control chip or circuitry. The switch period is normally set by this comparator and the values of Rt and Ct, which work together to create an oscillator. In the present invention, the timing circuit 32 is modified to permit analog frequency modulation (FM) or digital pulse code modulation of the inverter timing, and therefore the lamp current. It should be understood that a wide range of possibilities exist for determining the timing of a switch period and the pattern of switch activation in the inverter. Any timing circuit that permits frequency modulation or digital pulse code modulation (W. M. Siebert, *Circuits, Signals, and Systems*, McGraw-Hill, New York, N.Y., 1986), e.g., with half-weight block codes, does not depart from the spirit or scope of the invention.

For illustration purposes, three different modulation circuits designed to modulate the behavior of the hysteresis oscillator are shown in FIGS. 7a, 7b and 7c. In the first design of FIG. 7a, the signal to be transmitted over the lamp light, e.g., an analog audio signal from a tape recorder or microphone, is received through an audio transformer 60 which can provide both voltage level conversion and safety isolation. The AC audio signal at the secondary of the transformer 60 is level-shifted by the action of a potentiometer 72 to create a signal which consists of an AC signal with a DC offset, ensuring that the voltage applied to R with respect to ground is always non-negative. The impedance of the potentiometer 72 should be low, i.e., on the order of the impedance of the transformer 60 secondary winding or smaller. Also, the resistance of the transformer 60 secondary winding should be large enough (e.g., 600 Ohms or more) to limit the current flowing out of the transformer, thus avoiding magnetic saturation. The filter formed by R and C serves to limit the high frequency content of the input signal. The breakpoint of this filter can be varied by changing the values of R and C to vary the bandwidth or baud rate of the transmitter. In our prototype, for example, R was eliminated entirely, leaving just the filtering provided by C and the transformer secondary impedance. The voltage level on the capacitor C varies slowly with respect to the switch frequency (e.g., half the switch frequency or less). This voltage level couples to the action of the hysteresis oscillator through two diodes 74 and a series capacitor 76. It alters the trigger point of the oscillator, permitting the voltage on C to frequency modulate the oscillator and therefore the inverter. In summary, the level of the slowly varying AC input voltage on the transformer primary ultimately frequency modulates the inverter and the current in the load and lamp.

The circuit in FIG. 7b can also modulate the inverter by similar means. In this case, however, the input signal is presented through an optoisolator 78 instead of a transformer. This design might be most suitable for discrete input data, i.e., data which assumed specific levels such as a digital waveform. However, with the optoisolator 78 with reasonably linear response, this design could also be used to transmit analog signals. Note that if isolation is not necessary, the input waveform could be applied directly to the RC filter.

The circuit in FIG. 7c can also be used to modulate the inverter. In this case, the AC input waveform is again presented through an isolation transformer whose secondary is connected to the middle point of a connection of two series varactor diodes 80. The secondary voltage alters the net capacitance of the two varactor diodes 80, which has the effect of changing the net capacitance in the hysteresis oscillator timing circuit, effectively changing the oscillation frequency. This again permits the AC input voltage to alter or modulate the operation of the inverter.

The present invention transmits coded data by varying the operating frequency of the lamp ballast. If the signal to be transmitted is an analog AC signal with a minimum frequency content above that of the human visual perception range for flicker and a maximum frequency content significantly below the nominal switch frequency of the inverter, it is sufficient to apply the signal directly to the input of one of the modulation circuits in FIGS. 7a, 7b and 7c. This will directly modulate the lamp 34 current and lamp light, and, because the signal is restricted to avoid very low frequency content (e.g., which is inaudible for audio data anyway), the lamp light will not appear to flicker to the human eye.

However, to encode a digital or discrete-level message in the lamp light, it is generally not sufficient to simply employ a direct frequency-shift-keying (FSK) scheme. Suppose for example, that we wished to transmit a string of bits, zeros and ones. In a simple FSK scheme a zero bit might be assigned an arc frequency of 36 kHz and a one bit assigned to 40 kHz. In this case, a long run of logic zeros followed by a long run of logic ones would result in a noticeable flicker in light intensity during the transition. Instead, this invention employs coding schemes that ensure that the light will not flicker visibly.

One method is the "sideband FM method," a modification of the approach used to transmit analog signals. Two different frequency values of sidebands around the arc current center frequency are used to represent the binary values. Since the two sidebands are shifted equal but opposite amounts around the carrier or center frequency, the average frequency remains the same and no flicker is observed. The other method involves shifting the base frequency of the light, but using a coding scheme more complex than a simple binary code to represent the signal. The prior art reports a three level code being used with each binary bit being represented by three different frequencies of the light. In this way, the average frequency remains the same. Unexpectedly and fortuitously, we have found that a two value coding, such as Manchester encoding, also allows binary bits to be transmitted with no observable flicker regardless of the nature of the data strings. We will refer to this modulation as "two level coding."

For example, in one of our prototypes, a two-level half-weighted coding scheme was used to eliminate visible flicker while transmitting digital data. The two level coding is based on Manchester coding, which is common in computer networks. It is employed to additional advantage in this invention to eliminate visible flicker. Manchester coding is one of a class of half-weight block codes that are suitable for this application (E. Bergmann, A. Odlyzko, and S. Sangani, "Half Weight Block Codes for Optical Communications," *AT&T Technical Journal*, Vol. 65, No. 3, May 1986, pp. 85–93). This two-level code shifts the arc frequency every $T_{sw}$ seconds, where a typical value is $T_{sw}=2$ milliseconds. A one or a zero bit does not correspond to a particular arc frequency, but rather, to a two-level pattern in arc frequency. The patterns are illustrated in FIG. 8. Logic one and zero bits are transmitted by patterns of length $2T_{sw}$, and a unique start bit, used to demarcate the beginning of a transmitted byte, is represented by a sequence $6T_{sw}$ in length.

Figure 9A:
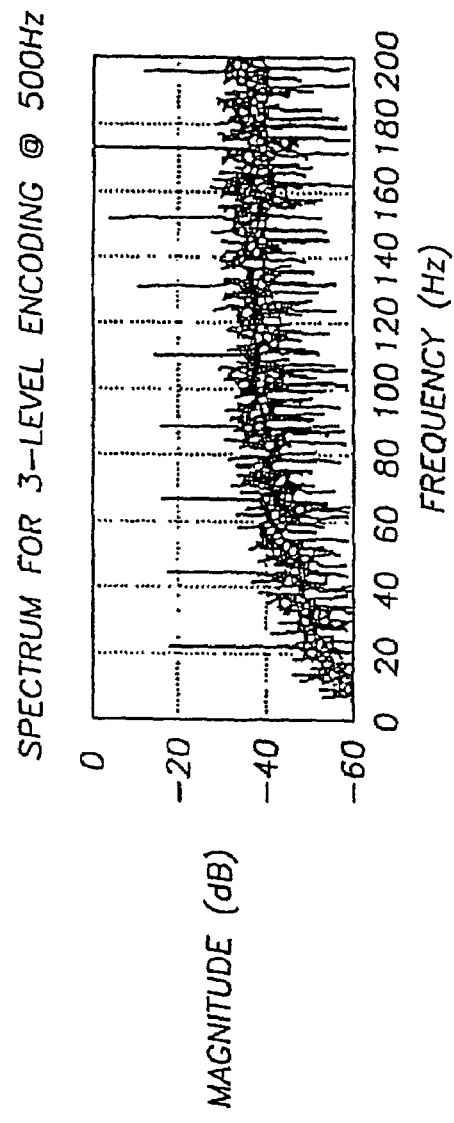
FIGS. 9a and 9b are graphs showing a spectrum comparison illustrating the advantage of half-weight bit coding.
Figure 9B:
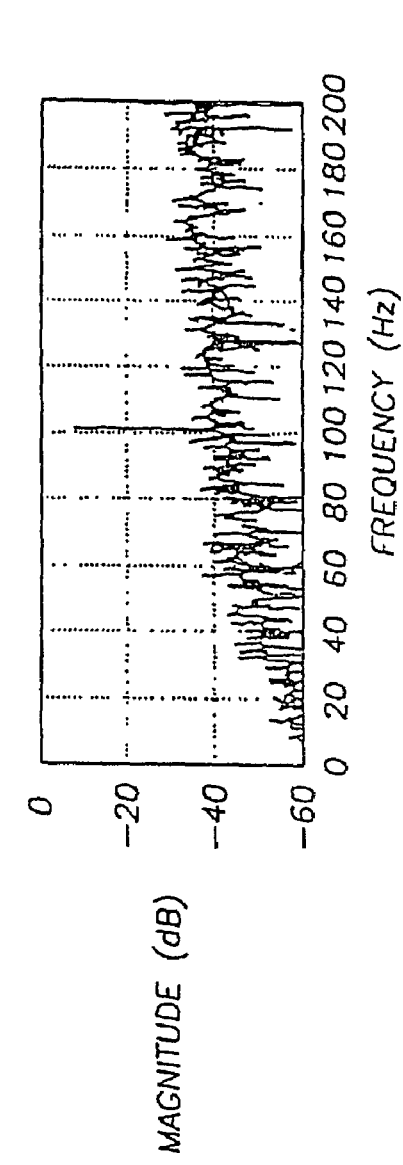

The two level patterns for the zero, one, and start bits have the same average frequency. Thus, for sufficiently rapid switching between the different arc frequencies, i.e., for a sufficiently short interval $T_{sw}$, the lamp exhibits no perceptible flicker, even during transitions between long sequences of zeros and ones. FIG. 9b shows the approximate frequency spectrum of the lamp intensity for the Manchester encoding scheme. The three-level encoding scheme described in T. Buffaloe, D. Jackson, S. Leeb, M. Schlecht, and R. Leeb, "Fiat Lux: A Fluorescent Lamp Transceiver," Applied Power Electronics Conference, Atlanta, Ga., June 1997 is included for comparison as shown in FIG. 9a. The vertical axes, in decibels, are normalized with respect to the largest magnitude AC component. The spectrums were calculated assuming-linear changes in intensity with frequency and a random stream of message data. The spectrums provide good qualitative estimates of the significant low-frequency components in the light output. FIG. 9a shows intensity variations at multiples of 22 Hz for the three-level coding scheme. The lower frequency components at 22 Hz and 44 Hz are frequencies which might be perceptible to the human eye. FIG. 9b shows the predicted spectrum using the new Manchester coding. The first significant component in this spectrum appears at 100 Hz, which is already above the range of human perception.

Figure 10:
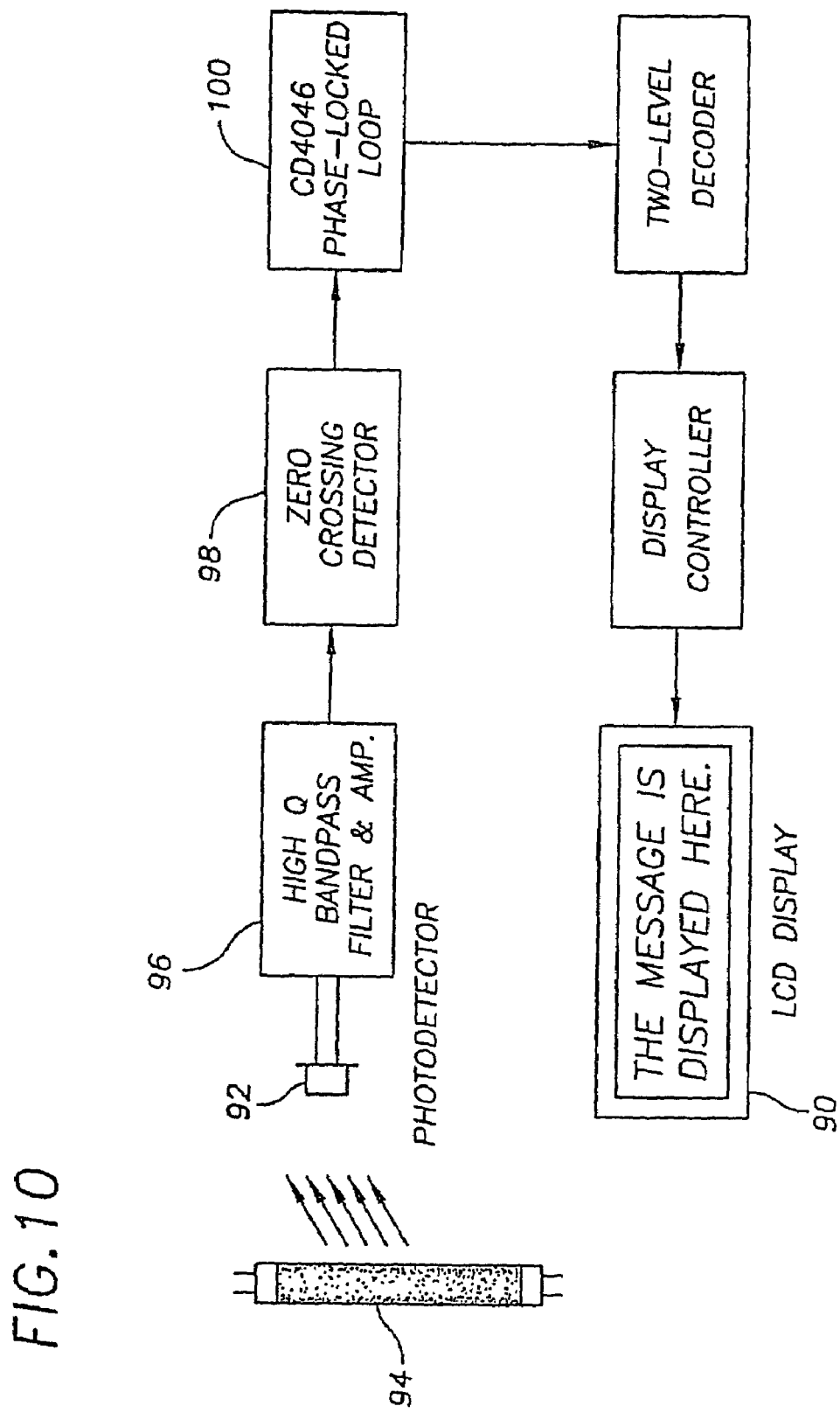
FIG. 10 is a block diagram illustrating a receiver architecture for decoding digital data transmitted by the light.

The modulated lamp light is detected and decoded by a receiver circuit. This receiver may take the form of a portable device where received information is displayed on a liquid-crystal display (LCD) 90 as shown in FIG. 10. A photodetector 92 is used to detect the light output of a fluorescent lamp 94. To help reject background variations in the ambient environment which are not caused by the operation of the transmitter, the photodetector signal is first passed through an analog bandpass filter and amplifier 96 in the receiver. Note that, while the arc frequency varies from 36 to 40 kHz, the received intensity signal varies from 72 to 80 kHz because the intensity varies with the magnitude and not the direction of the arc current. Zero crossings in the intensity signal are located using a comparator 98, and the frequency is tracked by a CD4046 phase-locked loop (PLL) 100.

The non-linear operation of the PLL loop 100 is critical to the increased performance of this invention. A conventional PLL circuit uses a feedback structure to track and output a voltage proportional to the frequency of an received signal. The performance of such a circuit can be accurately modeled, for small signal changes, as a linear system. The characteristics of the resulting linear system, such as its damping and settling time, affect the achievable data rate of the receiver system. The present invention significantly improves the performance of the PLL tracking performance in this application. This is accomplished by driving the PLL feedback loop into saturation at each of the received frequency limits. This establishes a situation where the PLL output voltage reaches saturation much faster than the settling time of the associated linear system.

The non-linear behavior of the receiver is illustrated in FIGS. 11a and 11b. These figures show operating waveforms from an experimental prototype system. FIG. 11a shows the transmitter waveform that is used to modulate the frequency of the fluorescent lamp ballast, zero volts corresponds to a frequency of 36 kHz and 15 volts corresponds to 40 kHz. FIG. 11b shows resulting output of the PLL using the non-linear saturating feedback loop. The output very accurately tracks the frequency changes in the lamp light with virtually none of the settling characteristics of a typical PLL.

Decoding of the Manchester-encoded data is accomplished asynchronously by oversampling the comparator outputs and inspecting the received pulse widths. This makes the task of decoding the half-weight code more challenging than that of decoding the tri-level scheme published in T. Buffaloe, D. Jackson, S. Leeb, M. Schlecht, and R. Leeb, "Fiat Lux: A Fluorescent Lamp Transceiver," *Applied Power Electronics Conference*, Atlanta, Ga., June 1997. However, the improved data transmission rate of the half-weight scheme, and the ready availability of commercial single-chip decoders for half-weight coded data, make the half-weight codes highly attractive for this application.

In our text transceiver prototype, a display controller stores the decoded information and periodically updates the incoming message on a two-line, liquid crystal display. In general the received digital data stream could be used to deliver a visual (text) or audio message, or could be processed directly by computer or other information handling system. See copending application Ser. No. 09/291,709 filed Apr. 14, 1999 entitled "Communication System" and application Ser. No. 09/292,126 filed Apr. 14, 1999 entitled "Analog and Digital Electronic Receivers for Dual-Use Wireless Data Networks" the contents of which are incorporated herein by reference.

The prototype transmits messages stored in a memory. A data encoder for reading the message in memory and encoding the data with a half-weight scheme is shown in FIG. 12. The output waveform of this encoder could be used to drive one of the modulation circuits in FIGS. 7a, 7b and 7c, thus transmitting the stored message in memory over the lamp light. Of course, other sources of input could be used. Coupled with a power-line carrier modem, the transceiver set could be used as a paging system that broadcasts messages in near real-time. A transmitter network could be constructed in a building simply by installing new ballasts in existing fluorescent lamp fixtures, with no additional wiring. These fixtures make excellent transmission sources since they are designed to flood rooms with light, as opposed to custom wireless infra-red or low power radio-frequency transmitters.

The analog and digital half-weight frequency-modulated data-encoding schemes demonstrated here are by no means the only approaches for coding data in the lamp output. Other techniques might be used to improve transmission bandwidth or flexibility. We envision that orthogonal bit patterns could be employed in different lamp ballasts (or the same ballast dependent on a transmission "key code") to permit the transmission and reception of data on different channels in the same local area. One channel could be used, for instance, to provide location information, while another might be used for direct person-to-person paging. Also, note that a unique bit code could be appended to the beginning, end, or middle of each transmitted bit, byte, word, or page of digital data to mark it as belonging to a particular digital channel, analogous to a TV or radio channel. In this situation, a receiver could be programmed to present only data from a particular channel or set of channels, again creating the possibility of using either a single light or a single fixture to transmit multiple reception channels.

Figure 13:
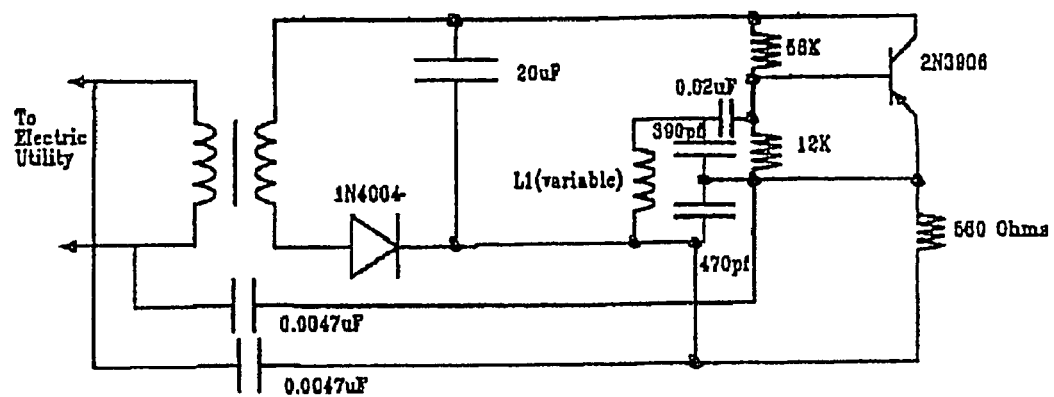
FIG. 13 is an electronic schematic diagram of a power line carrier transmitter that may be used with the present invention to transmit information to the source.

A useful method of providing information to the light for transmission through the system is a power line carrier modem. This technology permits the transmission of analog or digital data, including voice or audio information, text, graphics, and computer data, to the light ballasts for rebroadcast through the wireless network. A simplified schematic of such a power line carrier transmitter is shown in FIG. 13.

This transmitter consists of a Colpitts oscillator whose frequency is set by inductor L1 and the 390 and 470 pF capacitors. The oscillating waveform of this circuit varies at a frequency, e.g. 100 kHz, much higher than the utility frequency, e.g. 120 Hz. The oscillator waveform is impressed onto the AC utility through the two 0.0047 uF capacitors connected to the utility. The signal does not interfere with other devices on the utility, and can propagate well through a building wiring network. It tends to be attenuated by the service transformer at the entrance to a building, ensuring that the transmitted data remains well contained in the building. The Colpitts oscillator may be turned on and off or frequency modulated by additional circuitry (not shown in FIG. 13) to provide data transmission, including various pulse code schemes for data transmission.

The high frequency signal created by this transmitter travels through the building wiring network to each ballast. The ballasts will contain a capacitively coupled receiver, with a utility interface similar to the one used in the transmitter shown in FIG. 13 which will pass any received high frequency information from the transmitter containing the Colpitts oscillator through to a tuned circuit which will selectively recover the information. This information will then be rebroadcast through the network and/or used to reprogram the ballasts.

Figure 14A:
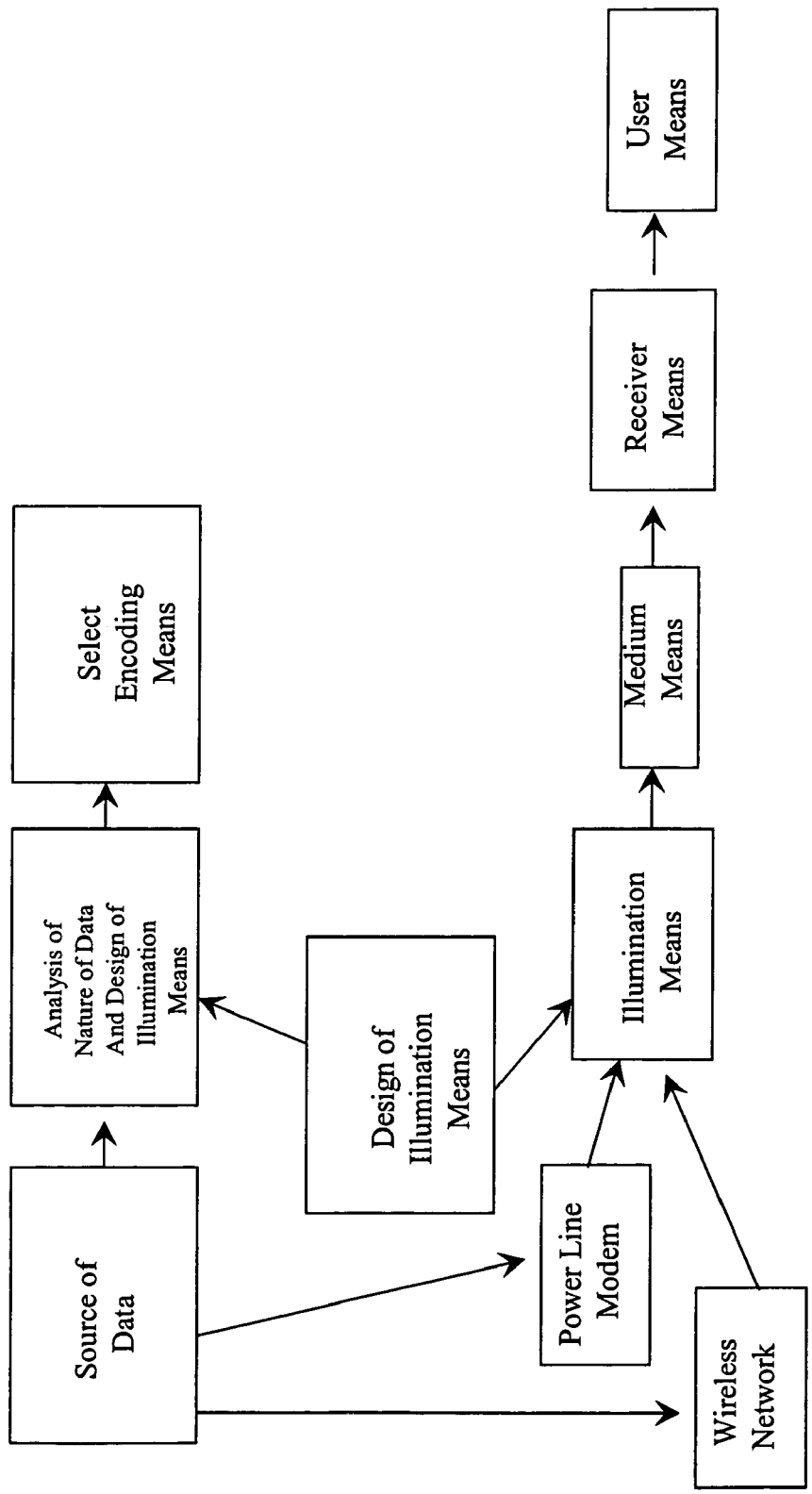
FIGS. 14a and 14b are block diagrams of certain embodiments of the present invention, wherein a power line modem or a wireless network is used to transmit information to the source.
Figure 14B:
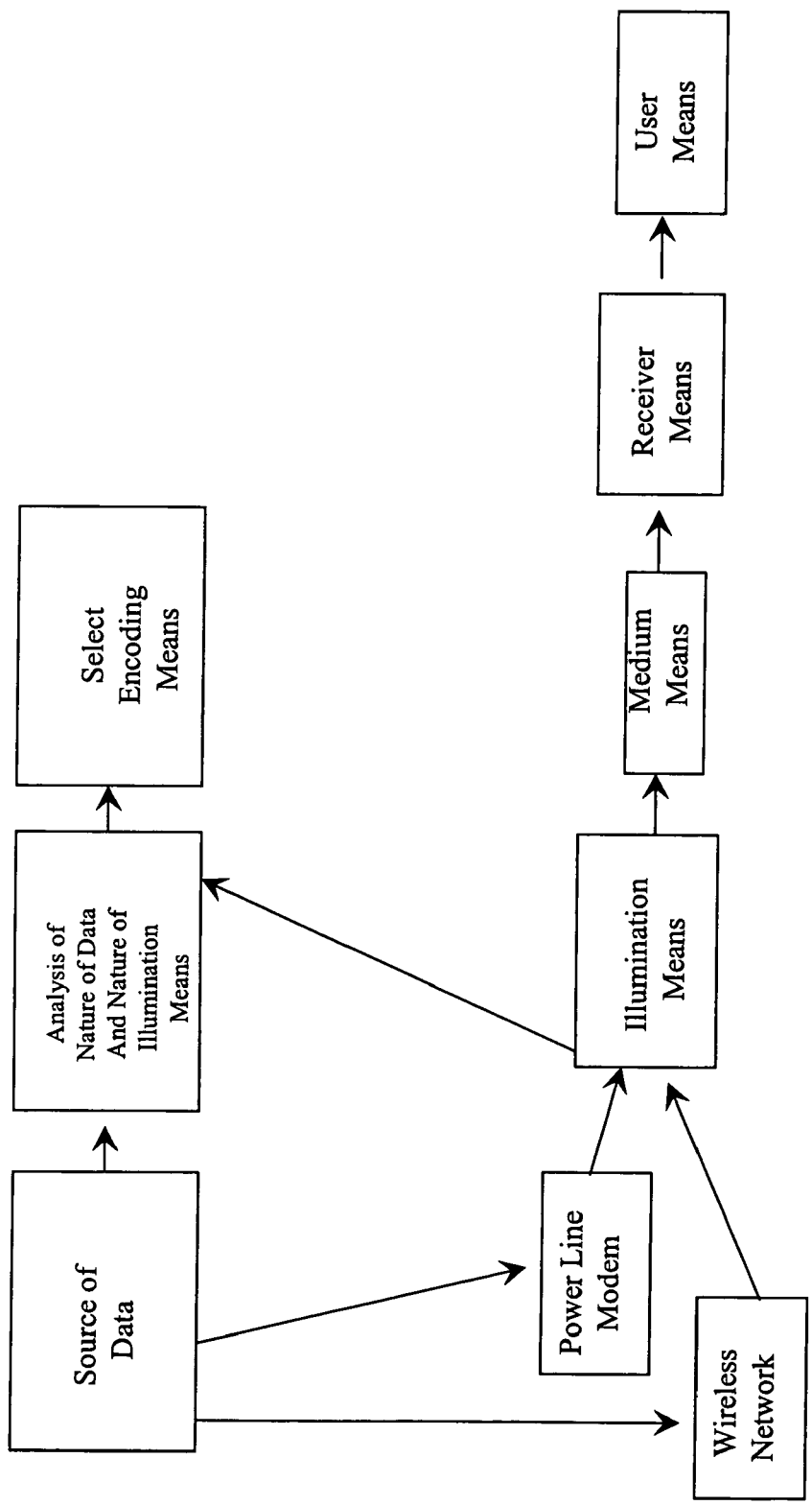

Alternatively, a wireless network can be used to transmit information to the ballast. There are several wireless network protocols which have come into common use including 802.11b, 802.11g and Bluetooth. The term WiFi is commonly used to describe many wireless networks although it is improved that other protocols and systems will be developed in the future and can be used with the non-flickering illumination based network. The ballast is equipped with an appropriate wireless network transceiver and the information is sent from another source with an appropriate wireless network transceiver to the ballast and from the ballast to the illumination source and then along the non-flickering illumination based network. This is illustrated in FIGS. 14a and 14b.

It should be realized by those skilled in the art that other, equivalent constructions to implement a transmitter which provides dual use of a radiation source, e.g., for illumination and also information transmission such as the system shown in FIG. 1, do not depart from the spirit and scope of the invention as set forth in the appended claims.

We claim:

1. A process for simultaneously providing illumination that is free to the eye of flicker and other distracting optical phenomena and for providing communication comprising the steps of:
providing a source of data comprising elements selected from a group consisting of analog data, digital data, control codes and start codes;
providing a design of an illumination means in which the illumination means can be modulated;
analyzing the nature of the data from the source of data and the design of the illumination means;
based on the analysis, selecting an encoding means for the data such that it is transmitted by modulating the illumination means without creating flicker or other distracting optical phenomena which are visible to the eye;
providing an illumination means based on said design of an illumination means;
providing a medium means through which the illumination passes;
providing a receiver means for receiving and processing the modulated illumination from the illumination means and extracting the encoded data;
providing a user means for using the data processed by the receiver means; and
transmitting data from the source of data to the illumination means, wherein the encoding means encodes the data, and the illumination means then transmits the encoded data by modulating the illumination means without creating flicker or other distracting optical phenomena visible to the eye, to the receiver means which receives and processes the modulated illumination, extracts the encoded data and supplies it to the user means.

2. The process of claim 1, wherein the data comprises analog data.

3. The process of claim 1, wherein the data is selected from the group consisting of control codes and start codes.

4. The process of claim 1, wherein the illumination means is selected from the group consisting of fluorescent lamps, high intensity discharge lamps, light emitting diodes, lasers, cathode ray tubes, particle beam emitters, liquid crystal displays, electroluminescent panels, klystrons, masers, incandescent lamps and gas discharge lamps.

5. The process of claim 1, wherein the data is selected from the group consisting of digital data, control codes and start codes.

6. The process of claim 5, wherein the data comprises digital data.

7. The process of claim 1, wherein the mechanism for transmitting the data from the source of data to the illumination means is selected from a group consisting of a power line modem and a wireless network.

8. The process of claim 7, wherein the mechanism for transmitting the data from the source of data to the illumination means comprises a power line modem.

9. The process of claim 7, wherein the mechanism for transmitting the data from the source of data to the illumination means comprises a wireless network.

10. A process for simultaneously providing illumination which is free to the eye of flicker and other distracting optical phenomena and for providing communication comprising:
providing a source of data comprising elements selected from a group consisting of analog data, digital data, control codes and start codes;
providing an illumination means;
analyzing the nature of the data from the source of data and the nature of the illumination means;
based on the analysis, selecting an encoding means for the data such that it is transmitted by modulating the illumination means without creating flicker or other distracting optical phenomena which are visible to the eye;
providing a medium means through which the illumination passes;
providing a receiver means for receiving and processing the modulated illumination from the illumination means and extracting the encoded data;
providing a user means for using the data processed by the receiver means; and
transmitting data from the source of data to the illumination means, wherein the encoding means encodes the data, and the illumination means then transmits the encoded data by modulating the illumination means without creating flicker or other distracting optical phenomena visible to the eye, to the receiver means which receives and processes the modulated illumination, extracts the encoded data and supplies it to the user means.

11. The process of claim 10, wherein the data comprises analog data.

12. The process of claim 10, wherein the data is selected from control codes and start codes.

13. The process of claim 10, wherein the illumination means is selected from the group consisting of fluorescent lamps, high intensity discharge lamps, light emitting diodes, lasers, cathode ray tubes, particle beam emitters, liquid crystal displays, electroluminescent panels, klystrons, masers, incandescent lamps and gas discharge lamps.

14. The process of claim 10, wherein the data is selected digital data, control codes and start codes.

15. The process of claim 14, wherein the data comprises digital data.

16. The process of claim 10, wherein the mechanism for transmitting the data from the source of data to the illumination means is selected from a group consisting of a power line modem and a wireless network.

17. The process of claim 16, wherein the mechanism for transmitting the data from the source of data to the illumination means comprises a power line modem.

18. The process of claim 16, wherein the mechanism for transmitting the data from the source of data to the illumination means comprises a wireless network.

* * * * *

UNITED STATES PATENT AND TRADEMARK OFFICE
CERTIFICATE OF CORRECTION

| | | |
|---|---|---|
| PATENT NO. | : 7,016,115 B1 | Page 1 of 1 |
| APPLICATION NO. | : 10/946166 | |
| DATED | : March 21, 2006 | |
| INVENTOR(S) | : Steven B. Leeb et al. | |

It is certified that error appears in the above-identified patent and that said Letters Patent is hereby corrected as shown below:

In the Specification

Column 1, line 3, after the title insert the following text:

--This invention was made with government support under grants 1R43DC04015 awarded by the National Institutes of Health and other U.S. Government grants and contracts. The government has certain rights in the invention.--

Signed and Sealed this
Third Day of September, 2013

Teresa Stanek Rea
*Acting Director of the United States Patent and Trademark Office*